(12) United States Patent
Ikeya et al.

(10) Patent No.: US 9,175,765 B2
(45) Date of Patent: Nov. 3, 2015

(54) TRANSMISSION AND SHIFT CONTROL SYSTEM

(75) Inventors: Shinji Ikeya, Kanuma (JP); Masao Teraoka, Sano (JP)

(73) Assignee: IKEYA FORUMLA CO., LTD., Tochigi (JP)

( * ) Notice: Subject to any disclaimer, the term of this patent is extended or adjusted under 35 U.S.C. 154(b) by 99 days.

(21) Appl. No.: 13/988,447

(22) PCT Filed: Nov. 4, 2011

(86) PCT No.: PCT/JP2011/006172
§ 371 (c)(1),
(2), (4) Date: May 20, 2013

(87) PCT Pub. No.: WO2012/066740
PCT Pub. Date: May 24, 2012

(65) Prior Publication Data
US 2013/0228027 A1    Sep. 5, 2013

(30) Foreign Application Priority Data

Nov. 19, 2010   (JP) .................................. 2010-259145
Dec. 17, 2010   (JP) .................................. 2010-281737

(51) Int. Cl.
| | |
|---|---|
| *F16H 3/08* | (2006.01) |
| *F16H 59/00* | (2006.01) |
| *F16H 61/04* | (2006.01) |
| *F16H 63/50* | (2006.01) |
| *F16H 63/30* | (2006.01) |

(52) U.S. Cl.
CPC .............. *F16H 61/04* (2013.01); *F16H 63/502* (2013.01); *F16H 2061/0474* (2013.01); *F16H 2063/3093* (2013.01); *F16H 2200/0008* (2013.01); *Y10T 74/19233* (2015.01); *Y10T 74/19274* (2015.01)

(58) Field of Classification Search
USPC ........................................... 74/325, 331, 335
See application file for complete search history.

(56) References Cited

U.S. PATENT DOCUMENTS 4,964,313 A    10/1990   Davis
5,827,148 A * 10/1998   Seto et al. ....................... 477/15
(Continued)

FOREIGN PATENT DOCUMENTS

| JP | 61-84441 | 4/1986 |
|---|---|---|
| JP | 2-195049 | 8/1990 |

(Continued)

OTHER PUBLICATIONS

Jun. 2005, Racecar Engineering (www.racecar-engineering.com).

*Primary Examiner* — Ha D Ho
(74) *Attorney, Agent, or Firm* — Jordan and Hamburg LLP

(57) ABSTRACT

The present invention is capable of suppressing gear shift shocks or delays in acceleration with no interruption of driving force and reducing the weight. Disclosed is a transmission which is provided, with multiple stage shift gears so arranged to shift a number of dog clutches to shift a gear to the upper stage of the multiple stage shift gears, and is characterized in that a guide part is provided to a shift operation section and the dog clutches on each of the sages so as to move the lower dog clutch in a neutral direction by a coasting torque acting on the lower stage by a shift rotation of the upper stage to release a meshing engagement when meshing engagements of the lower and upper dog clutches are simultaneously performed by an operation of the shift operation section.

10 Claims, 20 Drawing Sheets

(56) References Cited

U.S. PATENT DOCUMENTS

| | | | | |
|---|---|---|---|---|
| 6,164,149 | A * | 12/2000 | Ohmori et al. | 74/336 R |
| 6,276,224 | B1 * | 8/2001 | Ueda et al. | 74/335 |
| 6,389,916 | B1 * | 5/2002 | Fukuda | 74/335 |
| 6,450,918 | B1 | 9/2002 | Miyamoto | |
| 6,514,173 | B2 * | 2/2003 | Suzuki | 477/124 |
| 6,609,056 | B1 * | 8/2003 | Czarnecki et al. | 701/51 |
| 6,779,417 | B2 | 8/2004 | Ishihara et al. | |
| 6,884,200 | B2 | 4/2005 | Shimaguchi | |
| 8,171,814 | B2 | 5/2012 | Martin et al. | |
| 2002/0014130 | A1 * | 2/2002 | Ogami et al. | 74/335 |

FOREIGN PATENT DOCUMENTS

| | | |
|---|---|---|
| JP | 4-145248 | 5/1992 |
| JP | 2001-343066 | 12/2001 |
| JP | 2002-122157 | 4/2002 |
| JP | 2003-139233 | 5/2003 |
| JP | 2003-278907 | 10/2003 |
| JP | 2004-301153 | 10/2004 |
| JP | 2009-536713 | 10/2009 |

* cited by examiner

RELATED ART

TRANSMISSION AND SHIFT CONTROL SYSTEM

TECHNICAL FIELD

The present invention relates to a transmission and a shift control system that shifts gears of an automobile, a construction machinery, an agriculture vehicle, or the like.

BACKGROUND TECHNOLOGY

Generally, a transmission for a vehicle employing a single clutch inevitably involves gear shift shocks, delays in acceleration, and the like due to interruption of driving force when shifting gears. In a construction machinery an agriculture vehicle, or the like with large running resistance and small speed energy, it becomes stopped as soon as driving force is interrupted when shifting gears and may be hard to shift the gears.

To this, it is known that a twin-clutch transmission involves no interruption of driving force to prevent gear shift shocks or delays in acceleration.

However, there is a problem that the twin-clutch transmission is complicated in structure and heavy in weight.

In contrast, a seamless-shift transmission draws attention as one capable of reducing weight.

FIG. 29 is an operationally explanatory view of a seamless-shift transmission. In FIG. 29, for ease of explanation, a shift between a first speed and a second speed will be explained.

The seamless-shift transmission has three first burettes 305 and three second burettes 307 that engage with an input shaft between a first speed gear 301 and a second, speed gear 303 and move according to shift operation. On the first and second speed gears 301 and 302, meshing teeth 301a and 303a are formed, and at both ends of the first and second burettes 305 and 305, complicated different faces are formed in front and rear in a rotational direction.

The first and second burettes 305 and 307 are configured to move toward the first speed gear 301 or second speed gear 303 through a spring concerning an operation of a selecting fork.

With such a structure, for example, when shifting into the first speed gear 301, the three first burettes 305 engage with the meshing teeth 301a of the first speed gear 301, and thereafter, the remaining three second burettes 307 engage with the meshing teeth 301a.

When shifting into the second speed gear, the three second burettes 307 engage with the meshing teeth 303a of the second speed gear 303, and thereafter, the remaining three first burettes 305 engage with the meshing teeth 303a.

With the first burettes 305 and second burettes 307 having such complicated faces arid the selecting operation through the spring, it involves no interruption of driving force to prevent gear shift shocks or delays in acceleration and can reduce the weight.

However, there is a problem that the structure having the first burettes 305, the second burettes 307 and the like is complicated and increases in number of parts.

PRIOR ART DOCUMENT

Non-Patent Document

Non-Patent Document 1: June 2005 Racecar Engineering (www.racecar-engineering.com)

DISCLOSURE OF INVENTION

A problem to be solved by the invention is a complicated structure even if it involves no interruption of driving force to prevent gear shift shocks or delays in acceleration and reduces the weight.

A transmission according to the present invention is capable of involving no interruption of driving force to prevent gear shift shocks or delays in acceleration, reducing the weight, and simplifying the structure. The transmission comprises: multiple stage shift gears fixed to or relatively rotatably supported with driving force transmission shafts; a plurality of clutch rings each having meshing parts on both sides for meshing with the respective shift gears that take two speeds or more away from each other, so as to connect the respective shift gears to the driving force transmission shafts and perform a shifted output; a shift operation part that selectively operates the clutch rings; guide parts that are provided for respective stages of the shift gears between, the clutch rings and the driving force transmission shafts so that, when meshing engagements of the clutch rings of an upper stage and a lower stage are simultaneously performed through the operation of the shift operation part, axial forces oriented in opposite directions that are a meshing-engagement direction and a meshing-release direction are generated on the clutch rings of the upper stage and the lower stage.

A shift control system according to the present invention comprises: a start clutch that transmits and outputs a torque from an engine according to a fastening adjustment; a transmission that shifts gears through a shifting movement of a meshing clutch according to a vehicle speed to output the torque transmitted and output from the start clutch to drive wheels; a clutch actuator that performs the fastening adjustment of the start clutch; a shift actuator that causes the shifting movement of the meshing clutch; a torque detector that detects a transmitting torque toward the drive wheels; a clutch controller that controls the clutch actuator to perform the fastening adjustment so that a transmission torque of the start clutch is reduced during an interval just before and after shifting a gear while maintaining engine output transmitting torque detected by the torque detector at the time of shifting the gear and preventing an excessive shock torque due to the shifting.

The transmission according to the present invention, due to the above-identified means, involves no interruption of a driving force to prevent gear shift shocks or delays in acceleration, reduces the weight, and simplifies the structure.

The shift control system according to the present invention, due to the above-identified means, involves no interruption of a driving force to prevent gear shift shocks or delays in acceleration.

Figure 25:
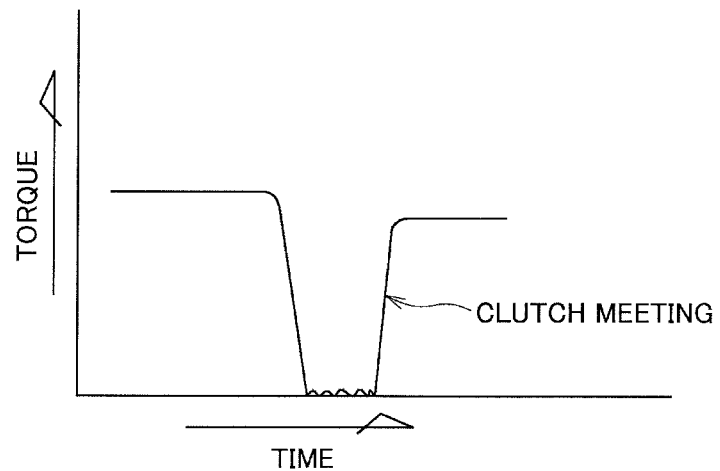
Figure 26:
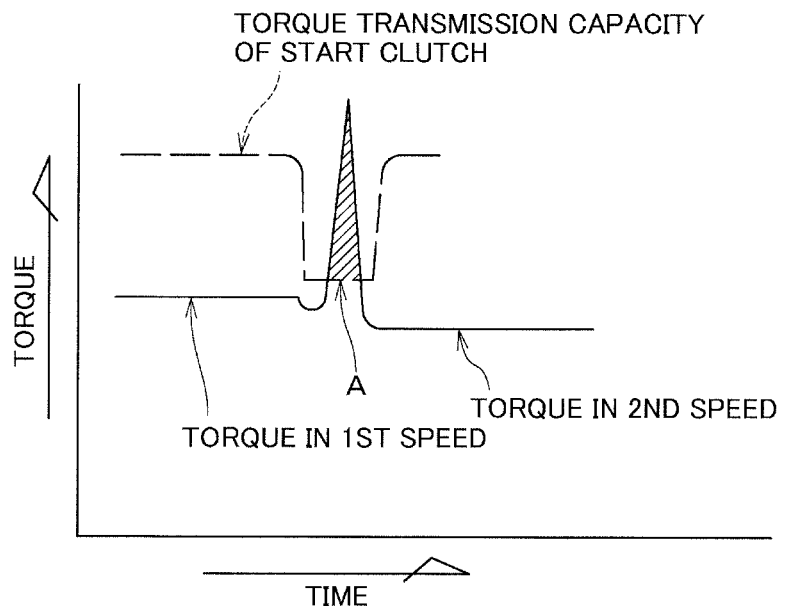
Figure 27:
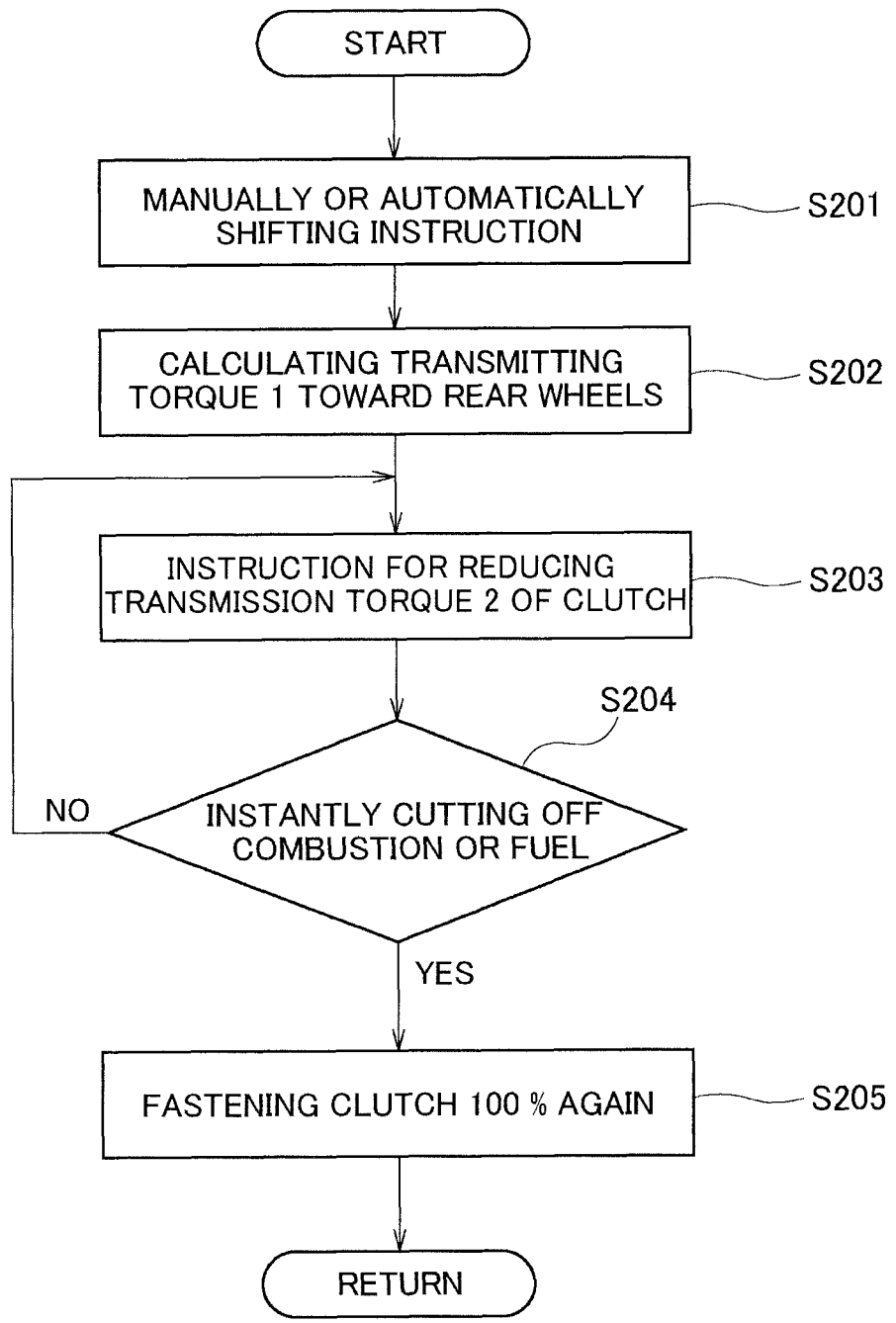
Figure 28:
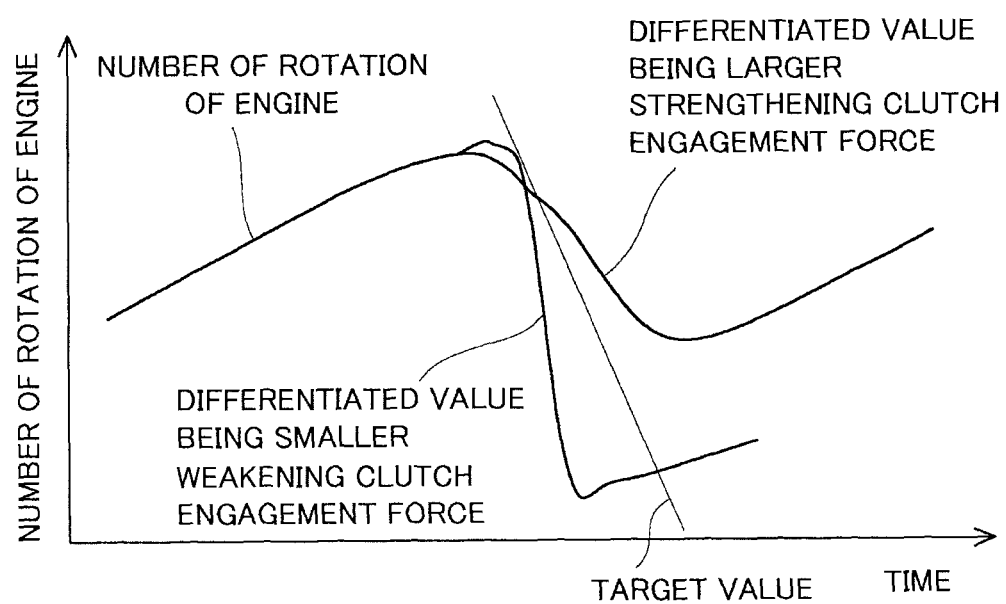
Figure 29:
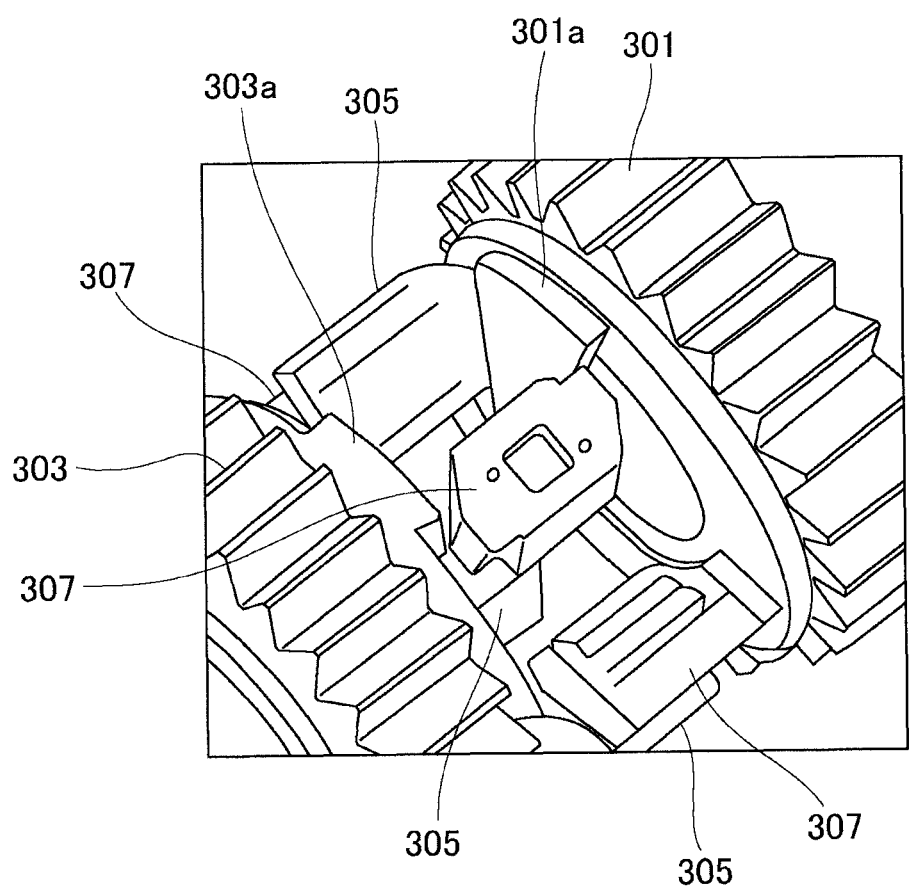

FIG, 24 is a graph illustrating a gear shift shock before and after shifting a gear;

FIG. 25 is a graph illustrating a relationship between an intermittence of the start clutch and a change in torque;

FIG. 26 is a graph illustrating a gear shift shock according to the shift control system;

FIG. 27 is a control flowchart;

FIG. 28 is a graph, illustrating a change in the number of rotation of an engine; and FIG. 29 is a perspective view illustrating a relevant part of a seamless shift transmission according to a related art.

EMBODIMENT FOR CARRYING OUT THE INVENTION

The object capable of involving no interruption of a driving force to prevent gear shift shocks or delays in acceleration, reducing the weight, and simplifying the structure is accomplished by guide parts that, when meshing engagements of meshing clutches of an upper stage and a lower stage are simultaneously performed, move the meshing clutch of the lower stage toward a neutral direction by a coasting torque acting on the clutch of the lower stage, thereby releasing the meshing engagement thereof.

The guide parts are provided for respective stages between the clutch rings and the driving force transmission shafts so that, when the meshing engagements of the clutch rings of the upper stage and the lower stage are simultaneously performed through an operation of a shift operation part, axial forces oriented in opposite directions that are a meshing-engagement direction and a meshing-release direction are generated on the clutch rings of the upper stage and the lower stage.

Embodiment 1

Figure 1:
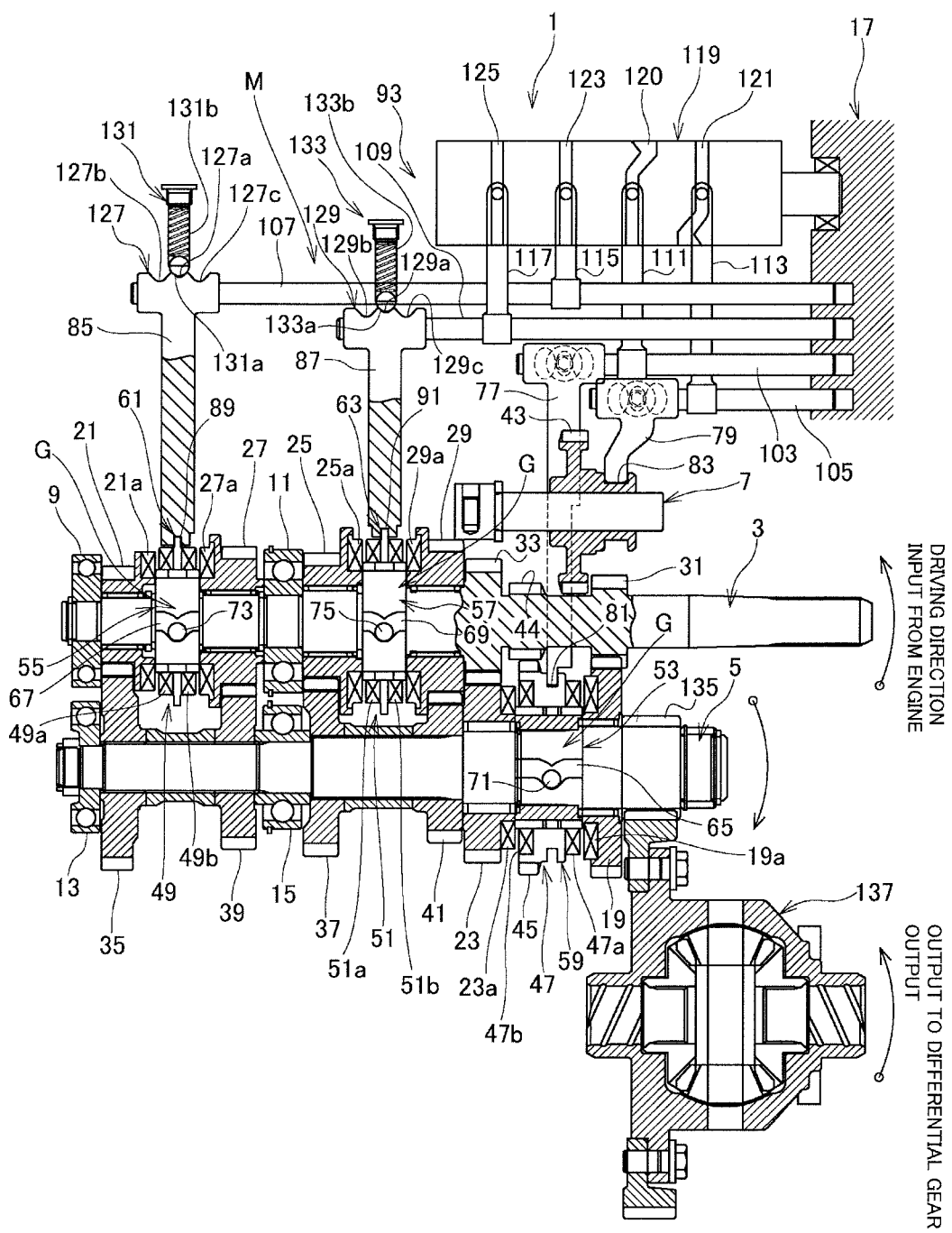
FIG. 1 is a schematic sectional view illustrating a transmission as well as a front differential gear according to Embodiment 1.
Figure 2:
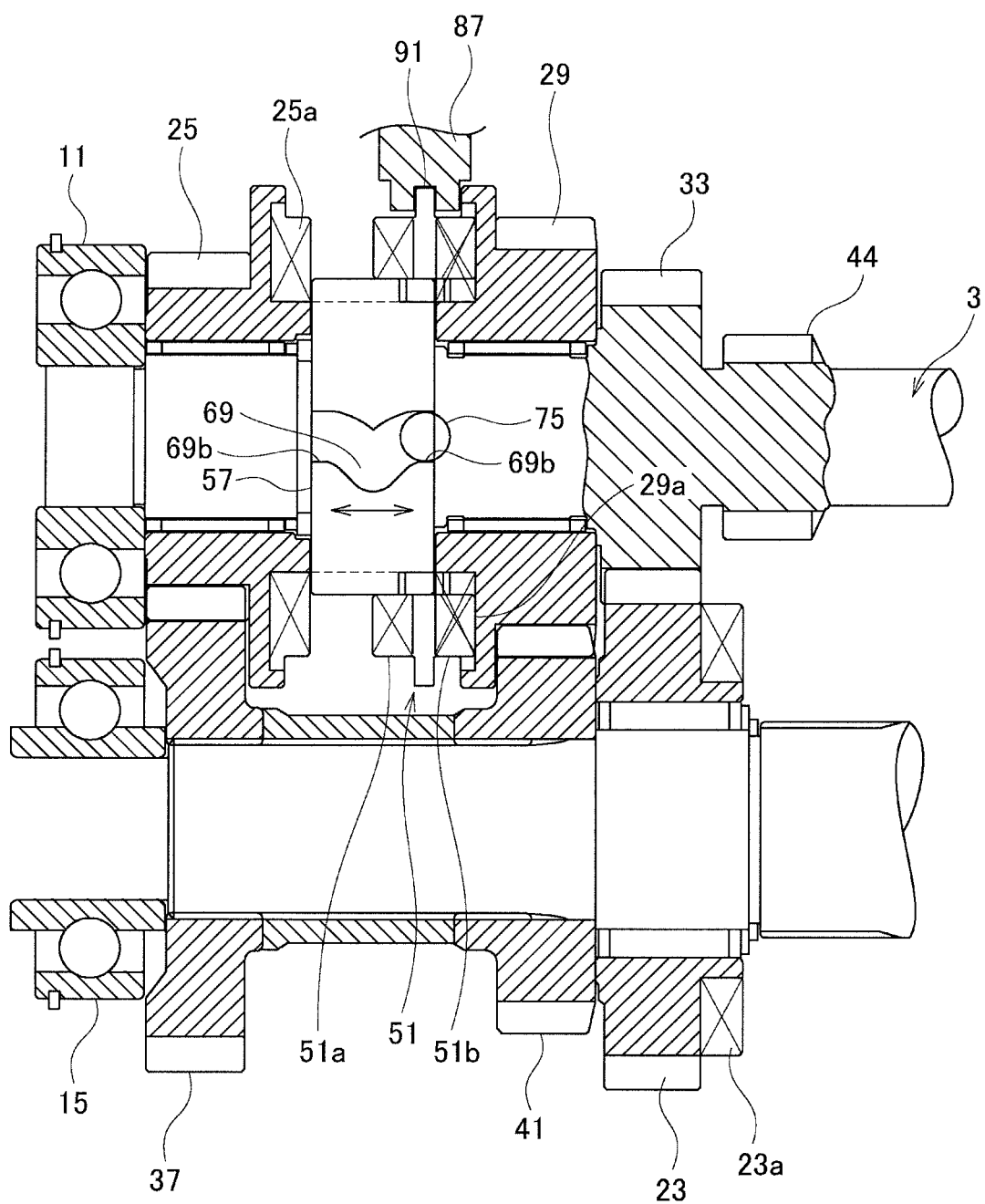
FIG. 2 is an enlarged sectional view of a relevant part of the transmission.

FIG. 1 is a schematic sectional view illustrating a transmission according to Embodiment 1 of the present invention as well as a front differential gear, and FIG. 2 is an enlarged sectional view of a relevant part of the transmission.

As illustrated in FIGS. 1 and 2, a transmission 1 is provided with a main shaft 3 and a counter shaft 5 as driving force transmission shafts, and an idler shaft 7. These main shaft 3 and counter shaft 5 are rotatably supported with a transmission case 17 through bearings 9, 11, 13, and 15, or the like. The idler shaft 7 is fixed on the transmission case 17 side.

A first speed gear 19, a second speed gear 21, a third speed gear 23, a fourth speed gear 25, a fifth speed gear 27 and a sixth speed gear 29 as multiple stage shift gears are fixed to or relatively rotatably supported with the main shaft 3 or the counter shaft 5.

The first speed gear 19 and third speed gear 23 on the counter shaft 5 mesh with output gears 31 and 33 of the main shaft 3, and the second speed gear 21, fourth speed gear 25, fifth speed gear 27, and sixth speed gear 29 on the main shaft 3 mesh with input gears 35, 37, 39, and 41 of the counter shaft 5, respectively.

A reverse idler 43 on the idler shaft 7 is arranged to be able to mesh with an output gear 44 on the main shaft 3 or an input gear 45 on the counter shaft 5 through an axial movement.

The first speed gear 19, the second speed gear 21, the third speed gear 23, the fourth speed gear 25, the fifth speed gear 27 and the sixth speed gear 29 are able to be connected to the main shaft 3 or the counter shaft 5 by first to third meshing clutches 47, 49, and 51 to perform a shift output.

The first to third meshing clutches 47, 49, and 51 shift gears to upper stages of the multiple stage shift gears by shifting a number of the first to third meshing clutches 47, 49, and 51.

Namely, the first speed gear 19, the second speed gear 21, the third speed gear 23, the fourth speed gear 25, the fifth speed gear 27 and the sixth speed gear 29 as the multiple stage shift gears are arranged to be shifted by shifting a number of the first to third meshing clutches 47, 49, and 51.

For example, shifting from the first speed gear 19 into the second speed gear 21 is performed by shifting the first and second meshing clutches 47 and 49.

The first to third meshing clutches 47, 49, and 51 has the same structure in essence and are provided with clutch cam rings 53, 55, and 57, clutch rings 59, 61, and 63, clutch teeth 47a, 47b, 49a, 49b, 51a, 51b, 19a, 21a, 23a, 25a, 27a, and 29a formed on respective opposing faces of the clutch rings 59, 61, and 63 and the first speed gear 19 to the sixth speed gear 29.

Therefore, the clutch rings 59, 61, and 63 move in an axial direction of the main shaft 3 or the counter shaft 5 to make connection for the shift output by selective meshing engagements of the clutch teeth 47a, 47b, 49a, 49b, 51a, 51b, 19a, 21a, 23a, 25a, 27a, and 29a.

On the clutch cam rings 53, 55, and 57 of the first to third meshing clutches 47, 49, and 51, v-shaped cam grooves 85, 87, and 89 are formed. The clutch cam ring 53 of the first meshing clutch 47 is connected to and is rotatable integrally with the counter shaft 5. The clutch cam rings 55 and 57 of the second and third meshing clutches 49 and 51 are connected to and are rotatable integrally with the main shaft 3.

The clutch rings 59, 61, and 83 of the first to third meshing clutches 47, 49, and 51 are arranged on and fitted to outer peripheries of the clutch cam rings 53, 55, and 57, and are axially movable. On inner peripheries of the clutch rings 59, 61, and 63, cam projections 71, 73, and 75 are formed to be fitted into and guided by the cam grooves 65, 67, and 69.

On the clutch ring 59 and reverse idler 43, circumferential recessed stripes 81 and 83 with which below-mentioned shift forks 77 and 79 engage are formed. On an outer periphery of the clutch ring 59, the input gear 45 are formed. On the clutch rings 61 and 63, circumferential protruding stripes 89 and 91 with which below-mentioned shift forks 85 and 87 engage are formed.

The first to third meshing clutches 47, 49, and 51 are selectively operated by a shift operation part 93. The reverse idler 43 is also operated by the shift operation part 93.

The shift operation part 93 is provided inside the transmission case 17 and has a plurality of shift forks 77, 79, 85, and 87, a plurality of shift rods 103, 105, 107, and 109, shift arms 111, 113, 115, and 117, and a shift drum 119.

The shift forks 77, 79, 85, and 87 are provided for the respective first to third meshing clutches 47, 49, 51 and reverse idler 43 and interlock with the meshing clutches 47, 49, 51 and reverse idler 43, The shift rods 103, 105, 107 and 109 support the respective shift forks 77, 79, 85, and 87.

The shift arms 111, 113, 115, and 117 are connected to the respective shift rods 103, 105, 107, and 109.

The shift drum 119 is provided with shift grooves 120, 121, 123, and 125 and projections at proximal ends of the shift arms 111, 113, 115, and 117 engage with these shift grooves 120, 121, 123, and 125.

Between the shift forks 85 and 87 side and the transmission ease 17 side, concavo-convex parts 127 and 129 and check parts 131 and 133 are provided. Between the shift fork 77 side and the transmission case 17 side, a concavo-convex part and a check part that have the same structures are provided and are omitted from the drawings.

The concavo-convex parts 127 and 129 are formed on the shift forks 85 and 87 and have positioning recesses 127a, 127b, 127c, 129a, 129b, and 129c. The positioning recesses 127a and 129a correspond to a neutral position and the positioning recesses 127b, 127c, 129b, and 129c correspond to coast meshing positions.

The check parts 131 and 133 are supported on the transmission case 17 side and push check balls 131a and 133a through check springs 131b and 133b so that the check balls 131a and 133a engage with the concavo-convex parts 127 and 129 by elastic force. With these engagements, the first to third meshing clutches 47, 49, and 51 can be positioned at the neutral position and the coast meshing positions.

An output of the transmission 1 is performed from a front differential gear 137 that engages with an output gear 135 of the counter shaft 5.

Namely, when the shift drum 119 is driven and rotated by a shift motor (not illustrated) based on a manual operating signal of a shift lever or an accelerator position signal, vehicle speed signal, and the like due to an operation of an accelerator pedal, the shift rods 103, 105, 107, and 109 are selectively driven in the axial direction through any of the shift arms 111, 113, 115, and 117 according to a guidance of the shift grooves 120, 121, 123, and 125.

With the selectively driving of the shift rods 103, 105, 107, and 109, the first to third meshing clutches 47, 49, 51 and reverse idler 43 are selectively operated through any of the shift forks 77, 79, 85, and 87. Due to this selective operation, the first speed gear 19 to sixth speed gear 29 and reverse idler 43 selectively operates to shift up or down a gear, or change into reverse.

In the shift operation part 93 and the first to third meshing clutches 47, 49, and 51, an internally-circulating torque is mechanically inescapably generated regardless of an output torque of the engine when meshing engagements of the clutches of an upper stage and a lower stage are doubly performed through the operation of the shift operation part 93. Guide parts G are provided for respective stages and function to move the clutch of the upper stage in a further-meshing-engagement direction by a driving torque acting there on due to the internally-circulating torque and to move the clutch of the lower stage toward a neutral direction by a coasting torque acting thereon due to the internally-circulating torque to release the meshing engagement thereof.

The guide parts G provide the first to third meshing clutches 47, 49, and 51 with the cam grooves 65, 67, and 69 and the cam projections 71, 73, and 75 as mentioned above. Through the cam grooves 65, 67, and 69 and the cam projections 71, 73, and 75, the driving torque and coasting torque are transmitted to the first speed gear 19, second speed gear 21, third speed gear 23, forth speed gear 25, fifth speed gear 27, sixth speed gear 29 in the coast meshing positions of the first to third meshing clutches 47, 49, and 51. Only in release-standby positions where the clutches shift away from the coast meshing positions toward meshing-release sides, the meshing engagements are guided toward the neutral directions due to the coasting torque.

The guide parts G provide the shift operation part 93 with a locomotive transmission mechanism M and provide the first to third meshing clutches 47, 49, and 51 with below-mentioned driving inclined faces F on only positive driving torque transmission side.

The driving inclined faces F generates locomotive according to the driving torque, to displace the clutch rings 59, 61, and 63 of the first to third meshing clutches 47, 49, and 51 to the release-standby positions. The inclined faces F may be formed on the clutch teeth on the gear side to provide the similar function.

Figure 3:
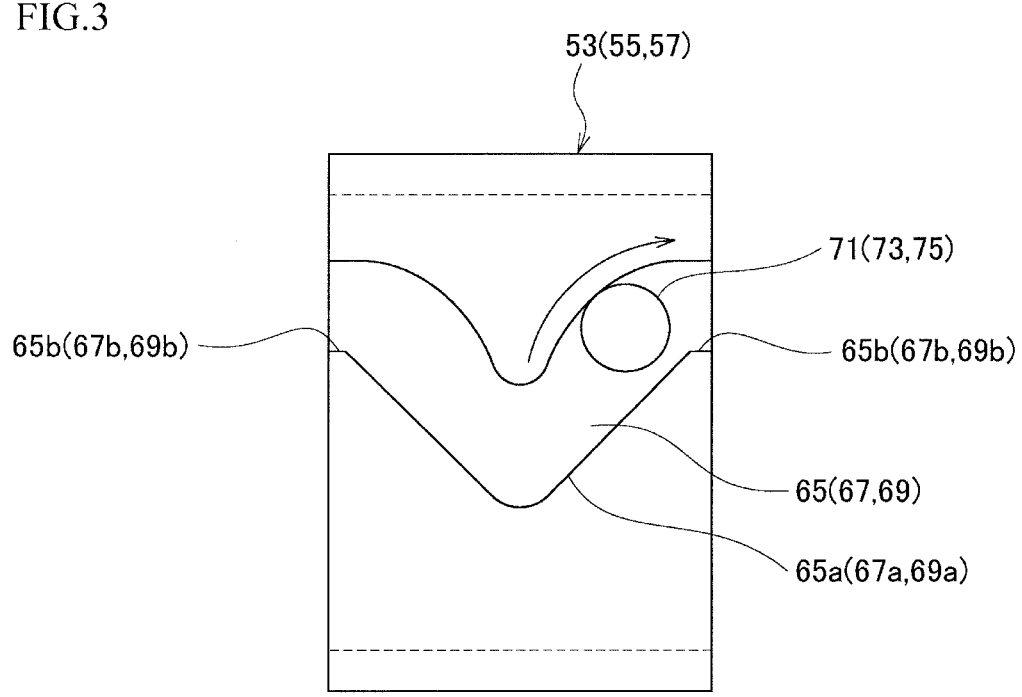
FIG. 3 is a development view illustrating a cam groove and a cam projection.
Figure 4:
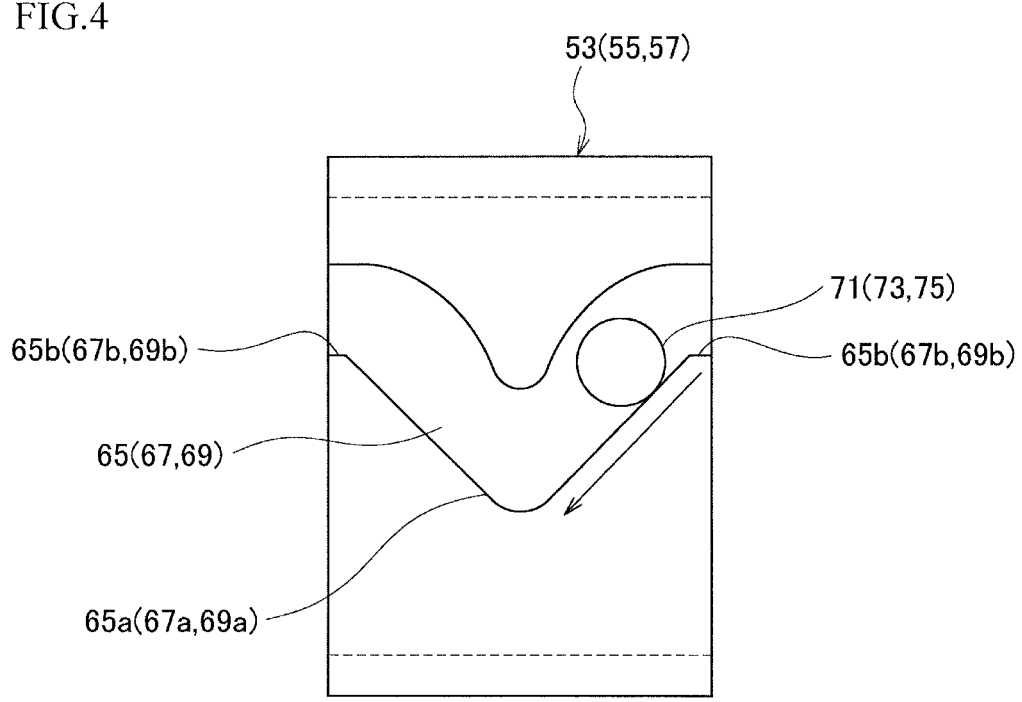
FIG. 4 is a development view illustrating the cam groove and the cam projection.
Figure 5:
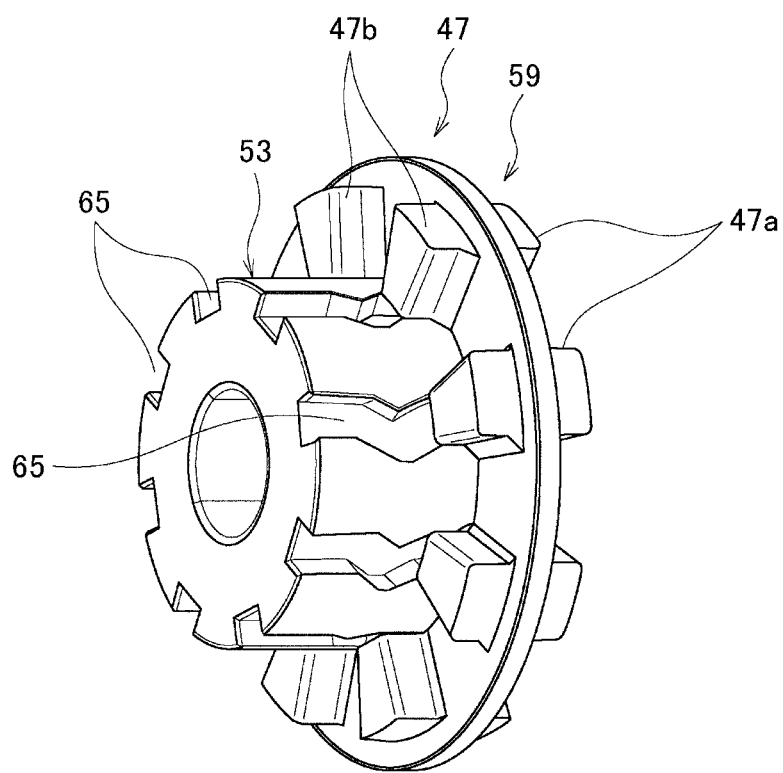
FIG. 5 is a perspective view illustrating a relationship between a clutch cam ring and a clutch ring.
Figure 6:
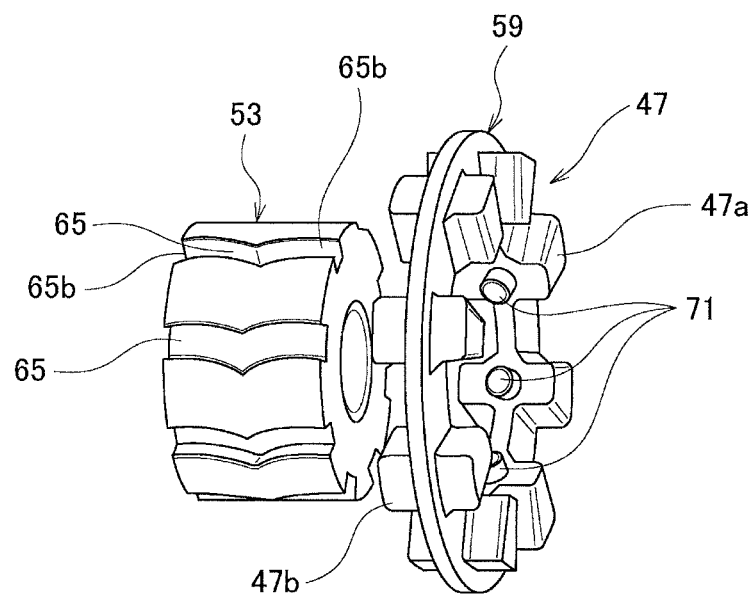
FIG. 6 is a perspective view illustrating a relationship between the clutch cam ring and the clutch ring.
Figure 7:
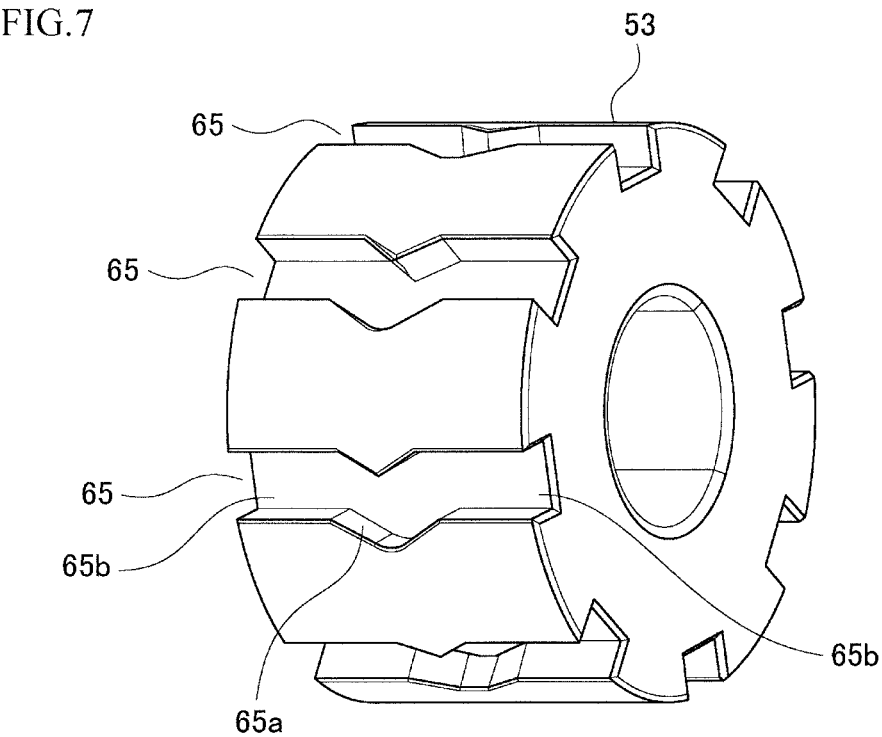
FIG. 7 is a perspective view illustrating the clutch cam ring.
Figure 8:
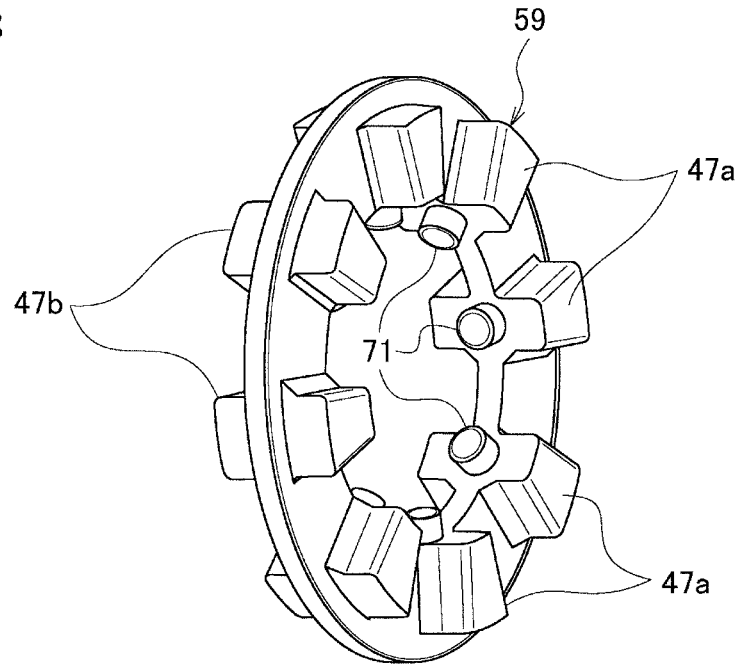
FIG. 8 is a perspective view illustrating the clutch ring.

FIGS. 3 and 4 are development views illustrating the cam groove and the cam projection, FIGS. 5 and 6 are perspective views illustrating the relationship between the clutch cam ring and the clutch ring. FIG. 7 is a perspective view illustrating the clutch cam ring, and FIG. 8 is a perspective view illustrating the clutch ring.

As illustrated in FIGS. 3-7, a plurality of the cam grooves 65, 67, and 69 are formed on outer peripheries of the clutch cam rings 53, 55, and 57 at regular intervals in a circumferential direction. The cam grooves 65, 67, and 69 has v-shaped parts 65a, 67a, and 69a formed at axial central portions that include portions corresponding to the neutral positions and level portions 65b, 67b, and 69b formed on both sides thereof.

Accordingly, in a case where the meshing clutches 47, 49, and 51 are in at non-release-standby positions, the cam projections 71, 73, and 75 are positioned at the level portions 65b, 67b, and 69b, so that the meshing clutches keep the meshing engagements without generating thrust toward the neutral positions even if the coasting torque acts.

The cam projections 71, 73, and 75 radially protrude from the inner peripheries of the clutch rings 59, 61, and 63 at regular intervals in a circumferential direction so that the cam projections are inserted into and guided by the respective cam grooves 65, 67, and 69.

Therefore, in the coast meshing positions of the first to third meshing clutches 47, 49, and 51, the cam projections 71, 73, and 75 are positioned at the level portions 65b, 67b, and 69b, thereby transmitting the driving torque or coasting torque to the first speed gear 19, second speed gear 21, third speed gear 23, fourth speed, gear 25, fifth speed gear 27, and sixth speed gear 29.

In the release-standby positions of the first to third meshing clutches 47, 49, and 51, the cam projections 71, 73, and 75 are positioned at the v-shaped portions 65*a*, 67*a*, and 69*a*, so that the meshing are guided toward the neutral direction due to the coasting torque as illustrated in FIG. 4.

Figure 9:
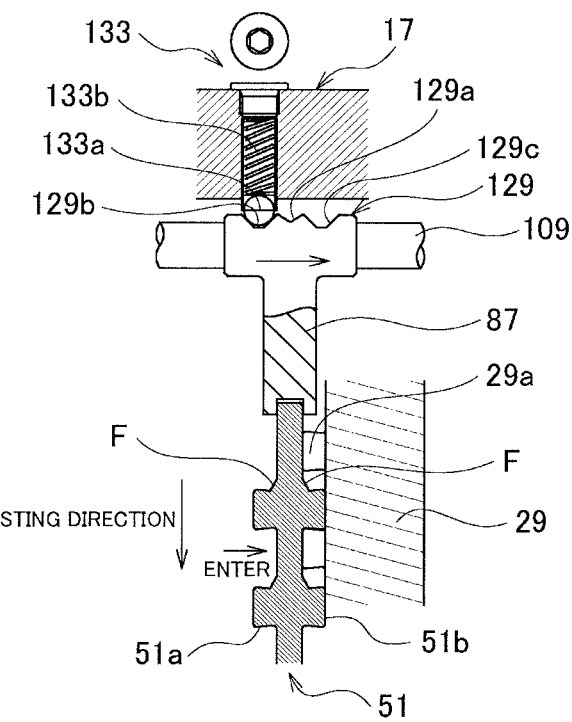
FIG. 9 is a schematic view illustrating a relationship among a shift fork, a check part, and a meshing clutch.
Figure 10:
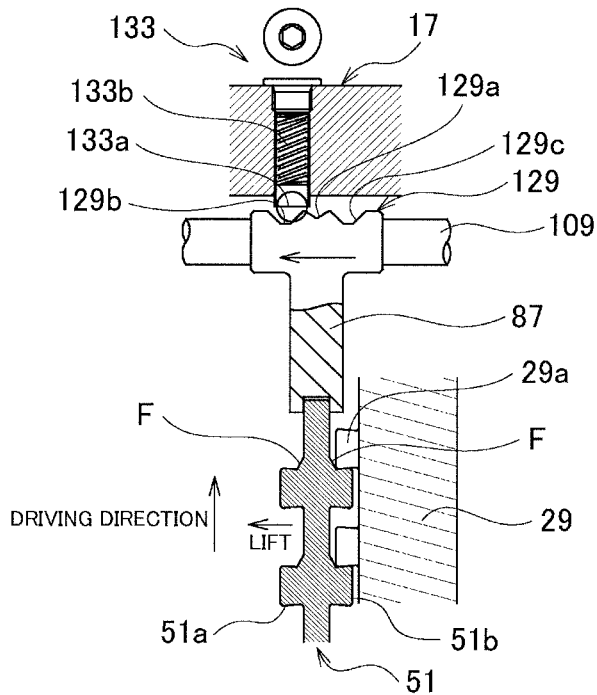
FIG. 10 is a schematic view illustrating the relationship among the shift fork, the check part, and the meshing clutch.
Figure 11:
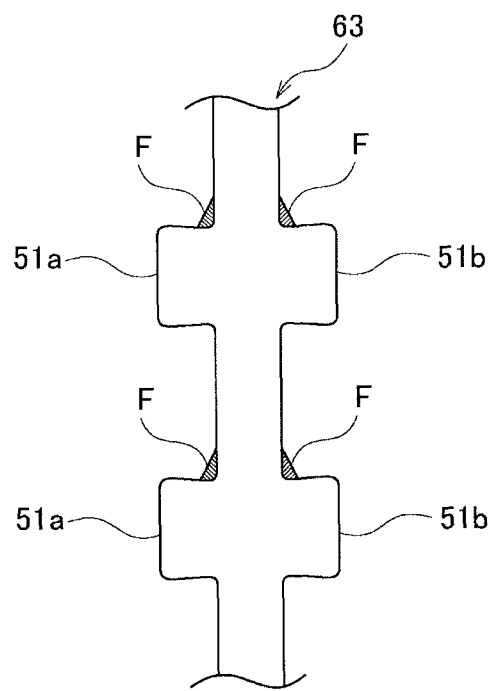
FIG. 11 is a development view illustrating the clutch ring.
Figures 12A, 12B:
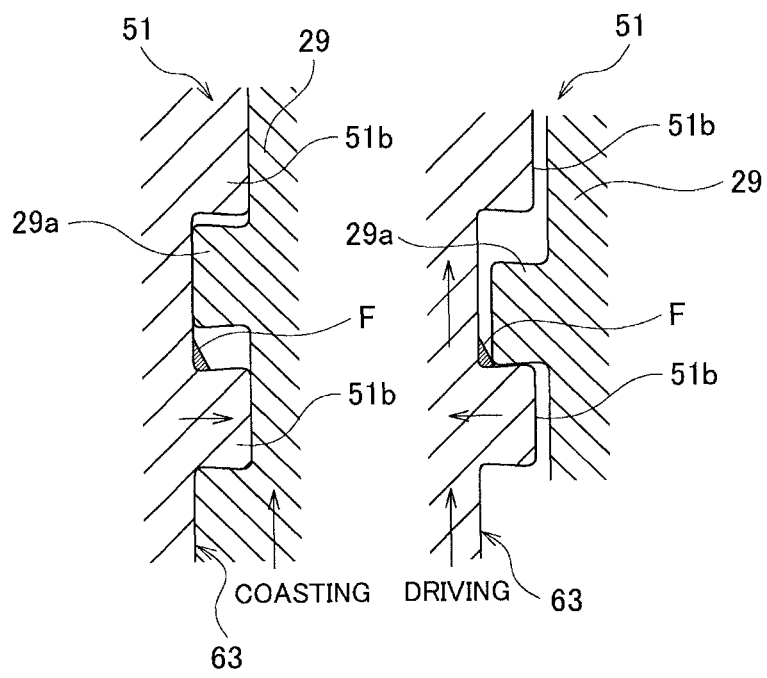
FIG. 12 They illustrate a meshing engagement of a dog clutch, (a) is a development view illustrating a coast meshing position and (b) is a development view illustrating a standby meshing position.

FIGS. 9 and 10 are schematic views illustrating the relationship among the shift fork, the check part, and the meshing clutch, FIG. 11 is a development view illustrating the clutch ring, and FIG. 12 illustrate a meshing engagement of a dog clutch in which (a) is a development view illustrating a coast meshing position and (b) is a development view illustrating a standby meshing position. In FIGS. 9-12, the third meshing clutch will be explained. Since the same applies to the first and second meshing clutches, duplicative explanation is omitted.

As illustrated in FIGS. 9-12, in the third meshing gear 51, the clutch teeth 51*a* and 51*b* of the clutch ring 63, and the clutch teeth 25*a* and 29*a* of the fourth speed gear 25 and the sixth speed gear 29 have tooth spaces in a circumferential arrangement that are larger than tooth thicknesses. A circumferentially-meshing face of each of the clutch teeth 51*a*, 51*b*, 25*a*, and 29*a* is inclined so that a root of a tooth is slightly narrowed.

At roots of the clutch teeth 51*a* and 51*b* of the clutch ring 63, the driving inclined faces F are formed on meshing faces that receive the driving torque, respectively.

Therefore, if the third meshing clutch 51 performs a meshing engagement connection with and is connected to the sixth speed gear 29 and tire driving torque acts on the clutch, the clutch ring 63 is displaced due to the driving inclined faces F as illustrated in FIG. 12(*b*). At this time, the recess 129*b* formed on the shift fork 87 pushes the ball 133*a* back to apply a pressure on the spring 133*b* and store energy in the spring as illustrated in FIG. 10.

The displacement is allowed by a looseness provided between the four speed shift arm 117 and the shift groove 125 in FIG. 1. Due to this displacement, the clutch ring 63 becomes positioned at the release-standby position where the clutch ring is displaced away from the coast meshing position toward the meshing-release side. Next, if the driving torque turns into the coasting torque, the teeth are pushed toward an opposite side and put out of the faces F illustrated in FIG. 12. Accordingly, the meshing engagement becomes deeper by the action of the recess 129*b* and the ball 133*a* due to the aforementioned energy of the spring 133*b* as illustrated in FIG. 12(*a*).

In this state, since the cam projection 75 in FIG. 2 is positioned at the level portion 69*b* of the cam groove 69, no thrust acting on the clutch ring 63 is generated.

Figure 13:
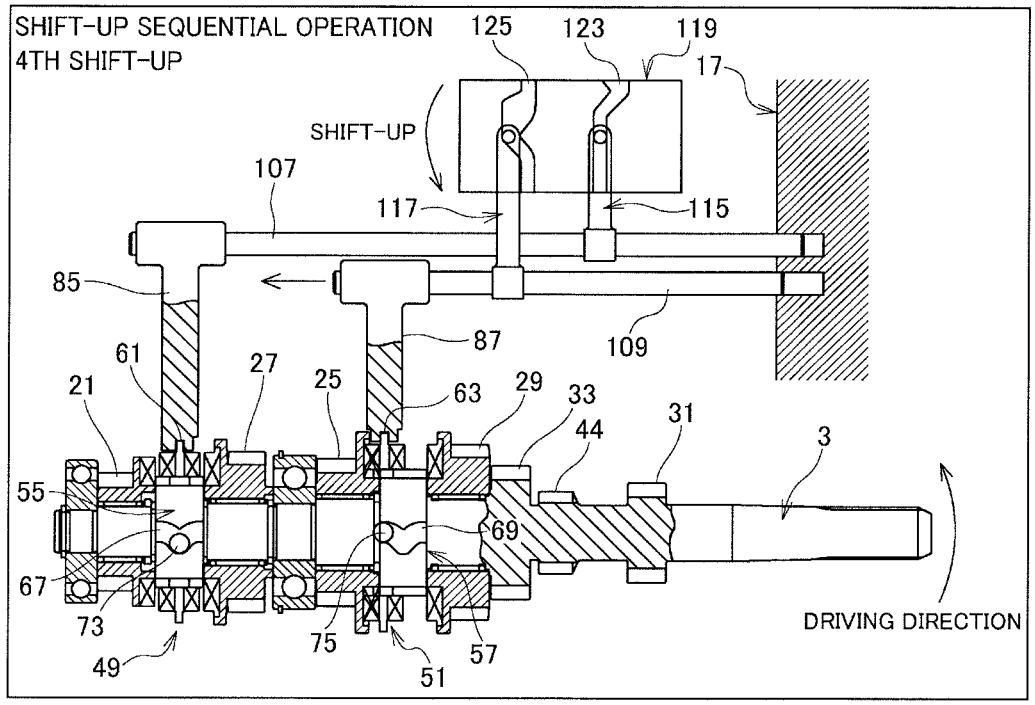
FIG. 13 is a schematic view illustrating a meshing engagement of a fourth speed gear of the transmission when shifting up a gear.

On the other hand, when starting to shift a gear to the upper stage, the shift drum 119 in FIG. 13 rotates to eliminate the aforementioned looseness with respect to the shift arm 117 according to a shape of the shift groove 125 of the lower stage, thereby maintaining the release-standby position. At this time, the projection 75 is shifted from the level portion 69*b* to an inclined face of the cam groove 69, the coasting torque is applied to the lower stage gear according to the meshing engagement of the upper stage gear, and a thrust component for a movement toward the neutral direction is obtained due to the inclined face of the cam groove 69. Concrete shifting action will be explained later.

Where, only a shift-up operation into the fifth speed (upper stage) from the fourth speed (lower stage) will be explained, for ease of explanation. The same applies to shift-up operations into the other stages.

Figure 14:
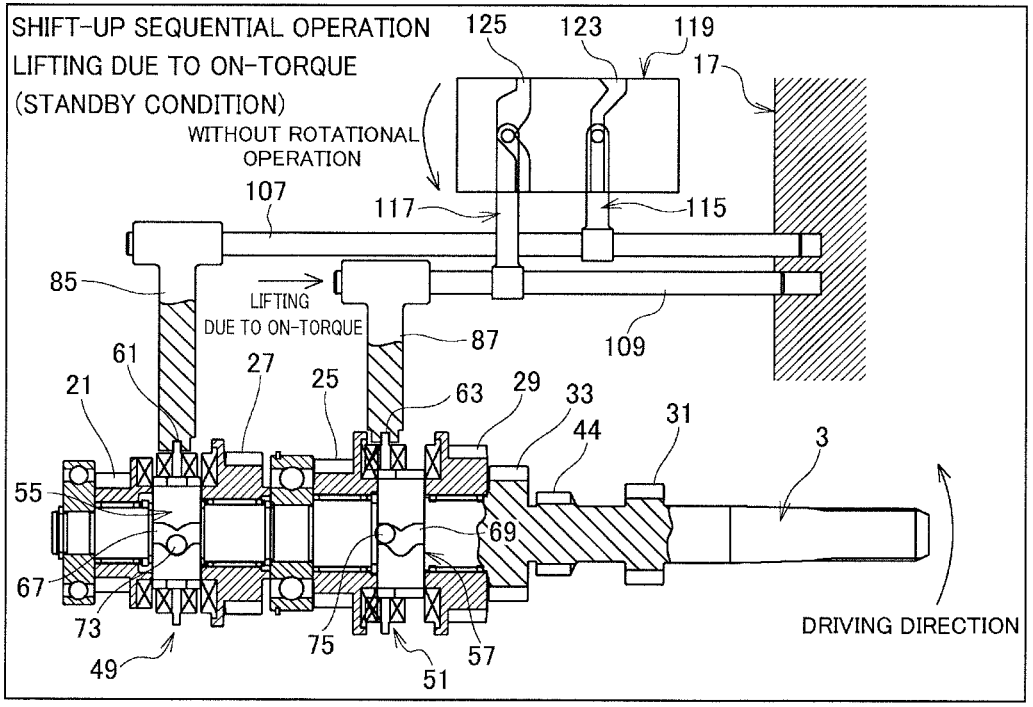
FIG. 14 is a schematic view illustrating a release-standby position of a fourth speed clutch ring of the transmission when shifting up a gear.

FIGS. 13-16 illustrate operations at the time of shifting up a gear. Since the drive torque is applied to the clutch teeth 25*a* for the fourth speed, the clutch ring 63 becomes in the release-standby position as illustrated in FIG. 14 due to the function of the inclined faces F. Namely, the projections 75 of the clutch ring 63 in the fourth speed position are on the slanted faces of the cam grooves 69. At this time, if the shift-up operation into the fifth speed is carried out by the rotation of the shift drum 119, the shift groove 123 functions to operate the clutch ring 61 through the shift arm 115, shift rod 107, and shift fork 85. With this operation, the clutch ring 61 engages with the fifth speed gear 27 so that the fourth speed gear 25 and the fifth speed gear 27 simultaneously perform the meshing engagements.

Figure 15:
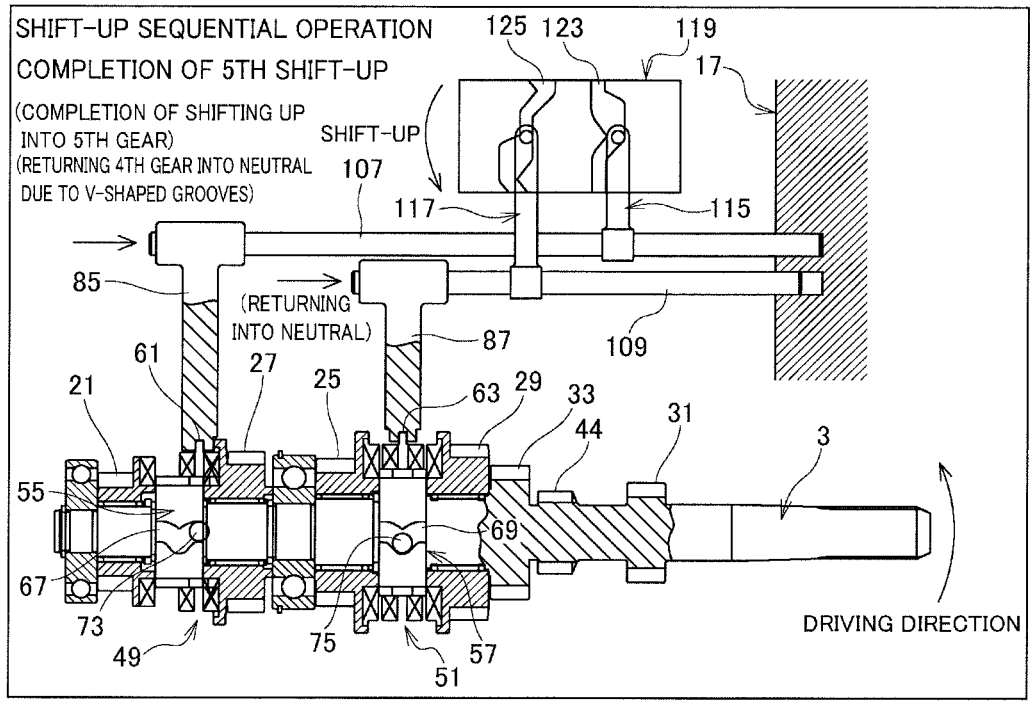
FIG. 15 is a schematic view illustrating a state completely shifting into a fifth speed.

At this time, the coasting torque occurs on the fourth speed side and the driving torque occurs on the fifth speed side due to the internally-circulating torque that is mechanically inescapably generated by the simultaneous meshing engagement regardless of the output torque of the engine. Through the function of the inclined faces of the cam grooves 69 and 67, these torque generates the thrust toward the neutral direction that is rightward in the drawings on the clutch ring 63 in the fourth speed position and the thrust toward the direction that is rightward in the drawings to deepen the meshing engagement on the clutch ring 61 in the fifth speed position. Due to this, the clutch rings 63 and 61 are shifted to given positions and the shift-up operation into the fifth speed is completed as illustrated in FIG. 15.

As an aspect of the transmission 1, when the clutch rings 59, 61, and 63 axially move, the clutch ring on the lower stage rotates to be relatively delayed and the clutch ring on the upper stage rotates to be relatively antecedent with respect to the cam rings 53, 55, and 57 rotating integrally with the main shaft 3 or the counter shaft 5 under the function of the inclined faces of the cam grooves 65, 67, and 69. This operation eliminates relative speed among the clutch teeth 19*a*, 21*a*, 23*a*, 25*a*, 27*a*, and 29*a* of the lower and upper gears that rotate at different speeds so that the doubly-meshing engagements are allowed, and generates a synchronization effect to absorb gear shift shocks.

If the shift-up operation is performed while engine braking occurs, the clutch ring 63 in the fourth speed position is shifted in a condition where the ring does not position at the release-standby position. At this time, the clutch ring 61 engages with the fifth speed gear 27 by the shift-up operation, so that a further coasting torque acts on the fourth speed, but the clutch ring 63 in the fourth speed position is not at the release-standby position so that the thrust component toward the neutral direction is not generated.

However, (1) an absolute value of the coasting torque at the time of the engine braking is smaller than that of the torque at the time of acceleration so that a frictional force acting on the meshing clutch is small; and (2) a strong thrust component is generated on the clutch ring 61 in the fifth speed position by the function of the inclined face of the cam groove 67. This thrust is transmitted through the shift fork 85 and shift rod 107 in the fifth speed position and the shift drum 119 to the shift rod 109 and shift fork 87 in the fourth speed position, to drive the clutch ring 63 in the forth speed position toward the neutral direction that is rightward in the drawings. Therefore, nothing hinders the shift-up operation in such a situation.

Even if the driving torque acts, the clutch ring 63 does not position at the release-standby position with absence of the inclined faces F. Even in this case, however, the clutch ring 63 is forcibly shifted toward the neutral direction due to the transmission of the force transmitted from the shift mechanism in the fifth speed position.

Accordingly, the inclined faces F are not fundamental to the present invention, and they are for smoothly shifting gears.

Further, the present embodiment performs the shift operation by the shift grooves 120, 121, 123, and 125 of the shift drum 119 (cylindrical cam). Instead, the present invention is realised by a planer cam, driving each shift rod by controlled hydraulic pressure, an electric motor, or air pressure.

When reducing speed, there is no need for the seamless shift unlike at the time of the acceleration. This is because the reducing speed is mainly performed by brakes, the output from the engine has no relevance to the reducing speed basically, and there is no problem even if the driving torque from the engine or engine braking torque is interrupted. Accordingly, similar to a standard manual transmission, the clutch ring 61 in the fifth speed position of the upper stage is shifted into neutral illustrated in FIG. 16 to interrupt the input, and then the clutch ring 63 meshes with the fourth speed gear 27 to shift down a gear.

From the above, it becomes the meshing engagement state in FIG. 13. In this way, the present embodiment has different modes of transitions for the meshing engagements in the shift-up operation and shift-down operation. This is based on that the shift rings 61 and 63 of the upper stage and lower stage are independent and linking shapes of the shift grooves 125 and 123 of the cylindrical cam 119.

A mechanism for such different shift modes in the shift-up operation and shift-down operation will be explained with reference to FIG. 17.

Figure 17:
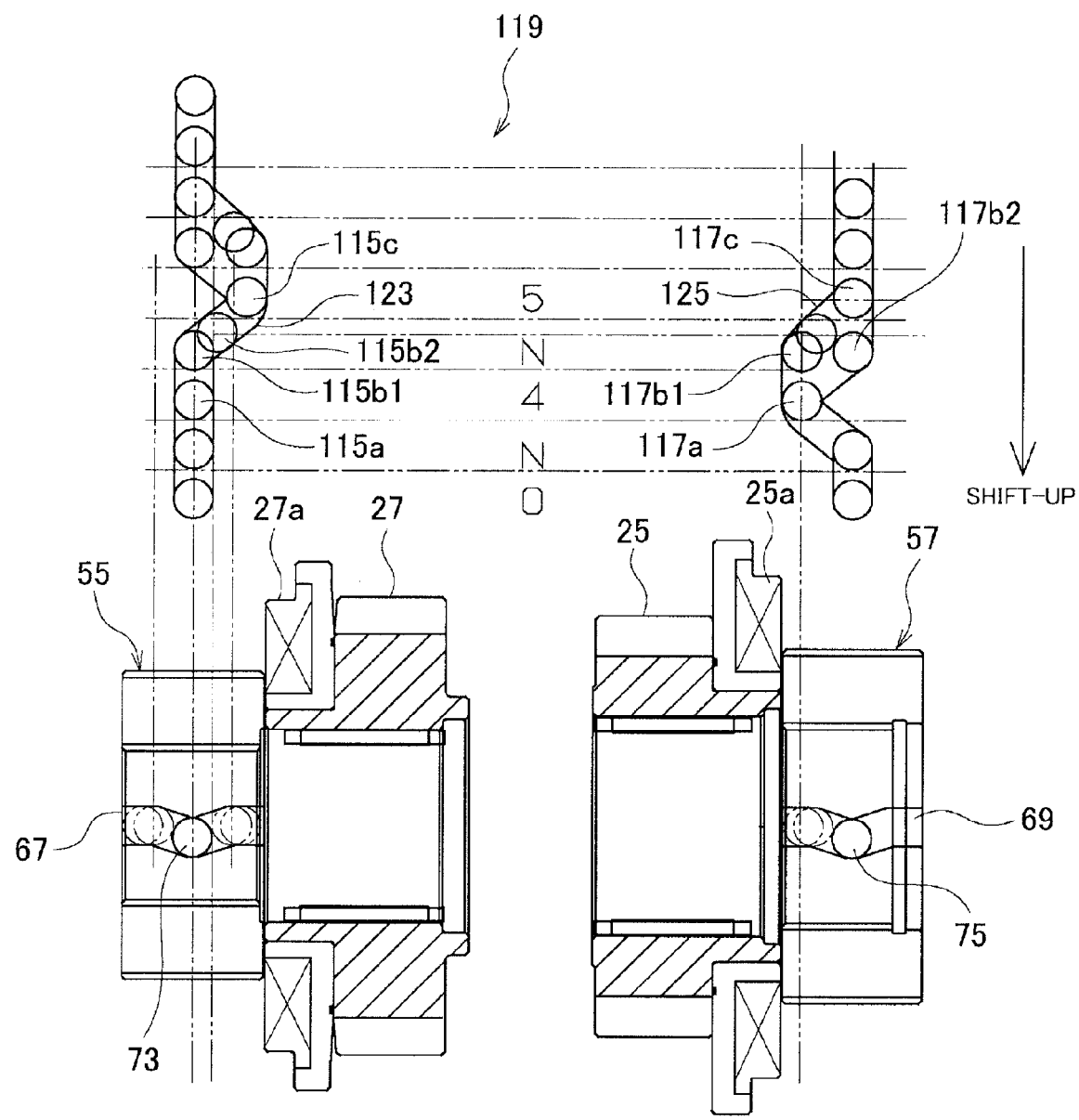
FIG. 17 is an operation of drum grooves when shifting up or down a gear.

In the fourth speed illustrated in FIG. 13, the shift, arm 117 and the shift arm 115 are at a position 115*a* and a position 117*a* in FIG. 17. If the shift drum 119 rotates frontward in the drawing to shift up a gear, the shift arm 115 moves from a position 115*b*1 through a position 115*b*2 to a position 115*c* according to an inclined face of the shift groove 123. At this time, a double engagement is caused and the shift arm 117 automatically moves to a position 117*b*2 from a position 117*b*1 due to the function of the inclined face of the cam groove 69 of the cam ring 57 to be shifted into neutral. Further, the shift arm is shifted to a position 117*c* according to the rotation of the shift drum 119. From the above, the shift-up operation from the fourth speed to the fifth speed is completed.

During the meshing engagement of the clutch in the fifth speed, the shift fork 117 is kept the neutral position by the check part 133 as illustrated in FIG. 1 by the check mechanism illustrated, in FIG. 9. The shift drum 119 rotates, even if the shift groove 125 involves a looseness with respect to the shift arm 117 at the position 117*b*2 of FIG. 17, so that the shift arm 117 is kept the neutral at the position 117*b*2 by the aforementioned check part 133.

Figure 16:
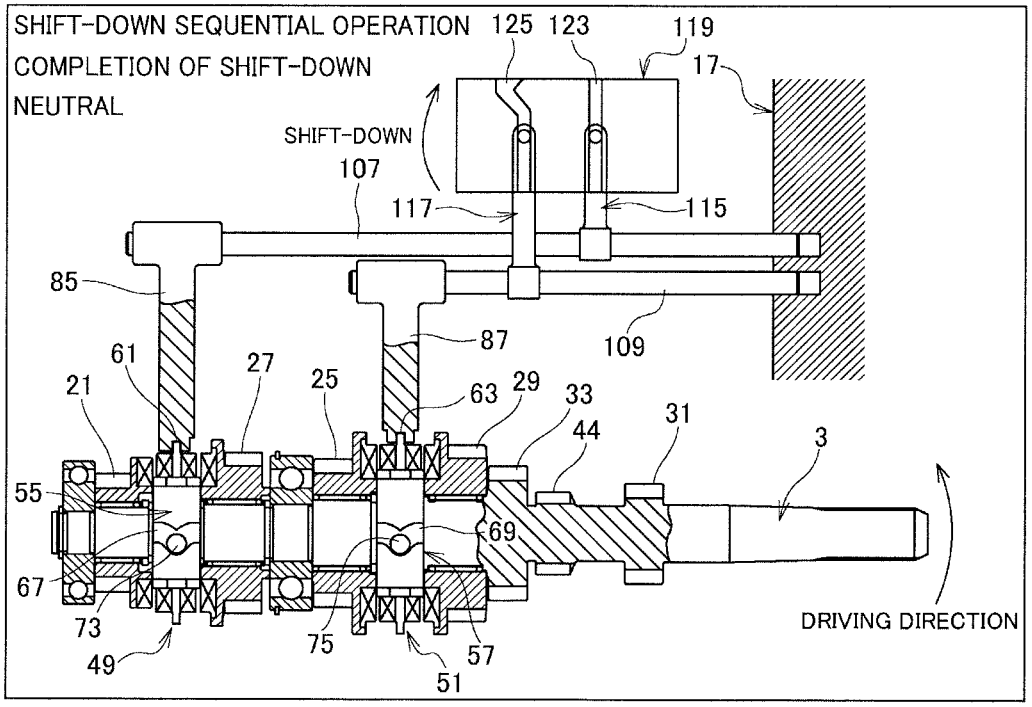
FIG. 16 is a schematic view illustrating a state where the fourth speed and the fifth speed are in neutral when shifting down a gear.

On the other hand, the shift arm 115 is shifted from the position 115*c* to the position 115*b*1 so that both the clutches in the fourth speed and fifth speed become neutral as illustrated in FIG. 16.

If the shift drum 119 further rotates, the shift fork 117 is shifted from the position 117*b*2 to the position 117*a*, the clutch ring 63 meshes with the clutch teeth 25*a* of the fourth speed gear 25, and the shift-down operation is completed as illustrated in FIG. 13.

The transmission may reverse orientations of inclined faces of cam grooves and positions of inclined faces F with respect to clutch, teeth under the aforementioned shifting principle so that the clutch ring on the lower stage side is guided toward the further-meshing-engagement direction and the clutch ring on the upper stage side is guided toward the neutral direction according to functions of the guide parts G when meshing engagements of the clutch rings of the upper stage and the lower stage are simultaneously performed.

This is because a shift-down operation is required to obtain more driving force when a construction machinery an agriculture vehicle, a heavy-duty truck or the like runs on mud or climbs a slope at a low speed, i.e., is under large running resistance and small speed energy. In such a situation, if a driving force is interrupted even for a short time when shifting down a gear in a standard meshing transmission, the vehicle becomes stopped to make it difficult to climb the slope or the like. The present invention can shift gears without interruption of the driving force, so that it is easy to shift down the gears to keep on running.

Figure 18:
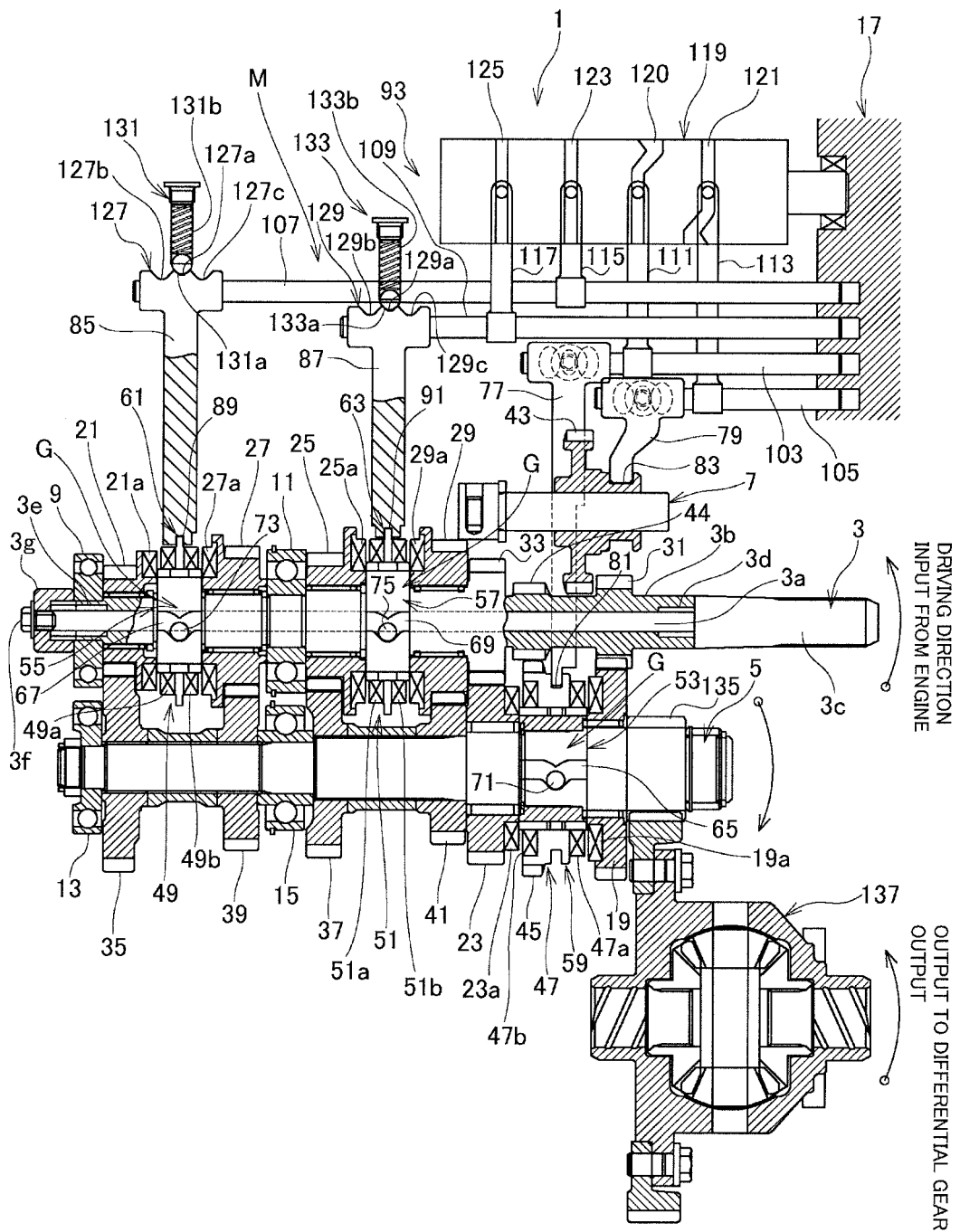
FIG. 18 is a schematic sectional view illustrating a transmission as well as a front differential gear.
Figure 19:
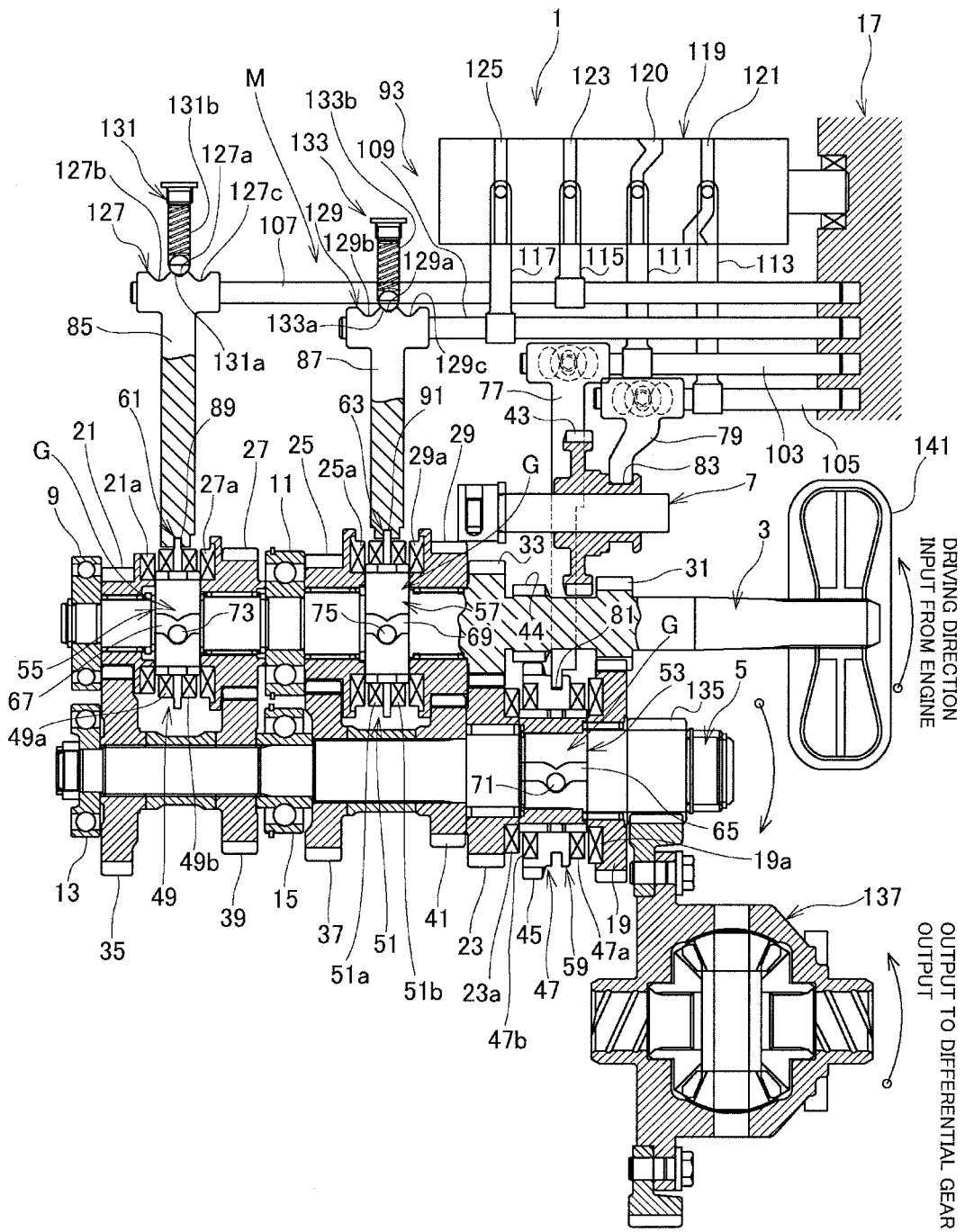
FIG. 19 is a schematic sectional view illustrating a transmission as well as a front differential gear.
Figure 20:
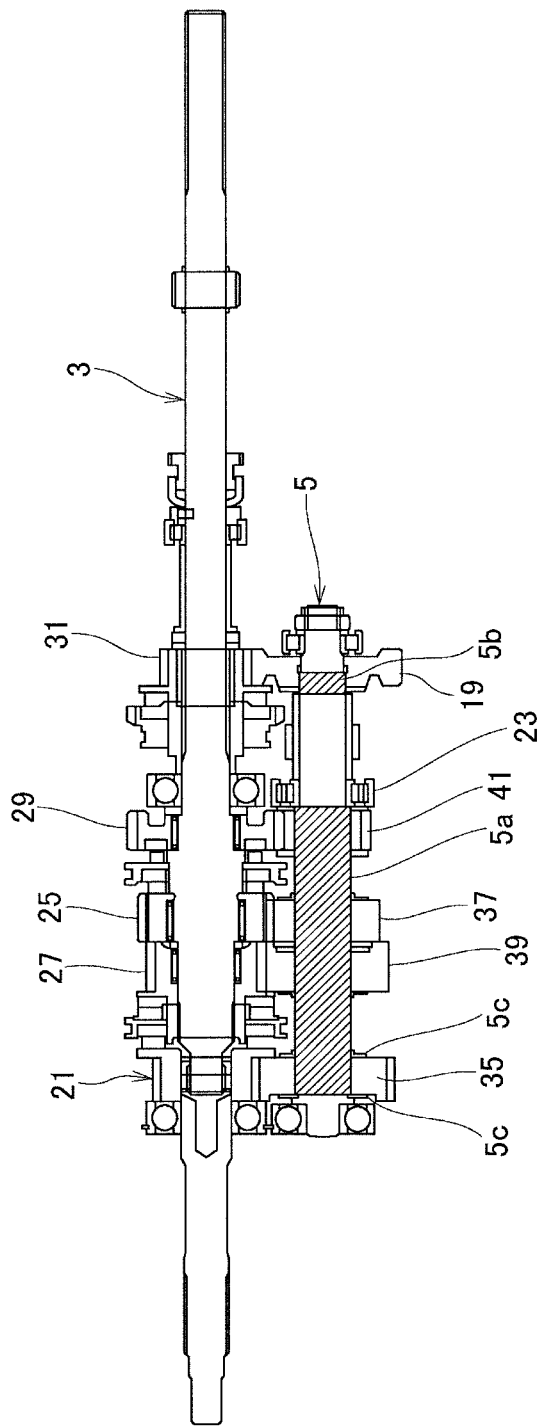
FIG. 20 is a schematic sectional view illustrating a transmission.

FIGS. 18-20 illustrate modified examples in which FIGS. 18 and 19 are schematic sectional views illustrating a transmission as well as a front differential gear, and FIG. 20 is a schematic sectional view illustrating a transmission.

In FIG. 18, a torsion bar 3*a* is incorporated into a main shaft 3. The main shaft 3 is provided with, in addition to the torsion bar 3*a*, a hollow part 3*b* including output gear 31 and 33, and the like, and, an input part 3*c* that receives a driving input from an engine side.

The torsion bar 3*a* is integrated, and coaxial with the input part 3*c*. The torsion bar 3*a* is relatively rotatably supported with the hollow part 3*b* through bushings 3*d* and 3*e*.

Ends of the torsion bar 3*a* and hollow part 3*b* protrude outward from a bearing 9, and an inside of a cap 3*g* that is joined to the torsion bar 3*a* with, a bolt 3*f* engages with an outer periphery of the end of the hollow part 3*b* through splines.

The remaining structure is the same as the aforementioned embodiment.

Therefore, if a torque from the engine is input to the main shaft 3, it can be input to the hollow part 3*b* on the output gears 31, 33, and the like side through the torsion bar 3*a*.

As a result, an appropriate torque transmission toward the output gears 31, 33, and the like side can be performed even if exponential torque is input from the engine.

In FIG. 19, a torque converter 141 is attached to a main shaft 3 so that a torque from an engine can be input to the main shaft 3 through the torque converter 141.

In FIG. 20, a counter shaft 5 is provided with, helical splines 5*a* and 5*b*, internal helical splines of respective input gears 35, 37, 39, and 41 on the counter shaft 5 engage with the one helical spline 5*a* and a first gear 19 engages with the other spline 5*b*. On both sides of each of the input gears 35, 37, 39, 41, and first gear 19, disc springs 5*c* are provided. Accordingly, the input gears 35, 37, 33, 41, and first gear 19 are axially pushed by the helical splines 5*a* and 5*b* so as to be positioned by the disc springs 5*c* when the counter shaft 5 rotates.

Embodiment 2

Embodiment 2 accomplishes the object capable of involving no interruption of driving force to prevent gear shift shocks or delays in acceleration, reducing the weight, and simplifying the structure by shift operations through meshing clutches and a clutch control of a start clutch.

Figure 21:
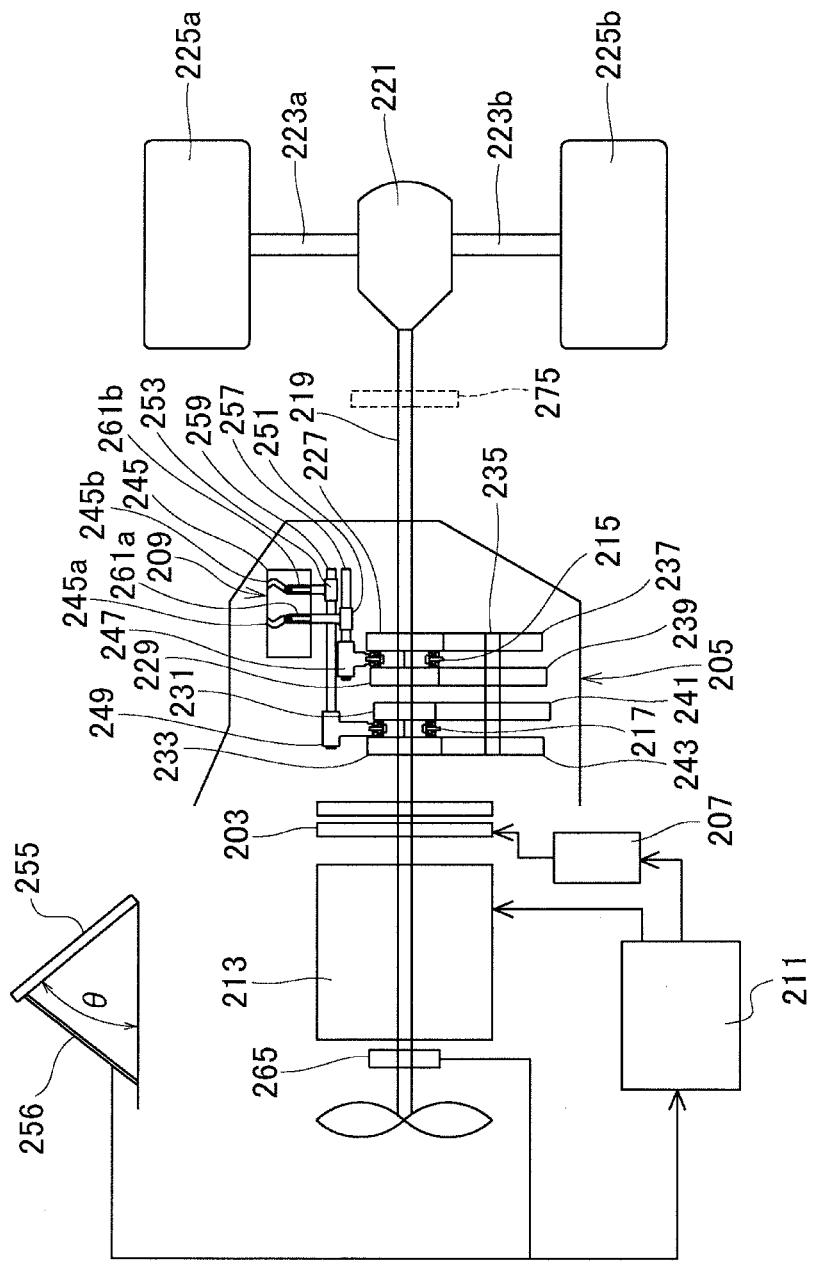
FIG. 21 is a schematic view illustrating a shift control system according to Embodiment 2.

FIG. 21 is a schematic view illustrating a shift control system.

As illustrated in FIG. 21, a shift control system 201 is provided with a start clutch 203, a transmission 205, a clutch actuator 207, a shift actuator 209, and a controller 211 as a torque detector and a clutch controller.

The start clutch 203 transmits and outputs a torque from an engine 213 by a fastening adjustment.

The transmission 205 shifts gears through shifting movements of dog clutches 215 and 217 as meshing clutches according to a vehicle speed to output the torque transmitted and output from the start clutch 203 to rear wheels 225a and 225b as drive wheels via a propeller shaft 219, a final reduction gear 221, and drive shafts 223a and 223b.

Where, the transmission 205 will be explained, as a forward four speed transmission and it will take no account of diameters of gears, for ease of explanation. The transmission 205 is provided with a first speed gear 227, a second speed gear 229, a third speed gear 231, and a fourth speed gear 233 that mesh with counter gears 237, 239, 241, and 243 of a counter shaft 35.

When the dog clutch 215 meshes with the first speed gear 227, a shift output for the output of the start clutch 203 is performed to the propeller shaft 219 through the fourth speed gear 233, counter gear 243, counter gear 237, and first speed gear 227.

When the dog clutch 215 meshes with the second speed gear 229, a shift output for the output of the start clutch 203 is performed to the propeller shaft 219 through the fourth speed gear 233, counter gear 243, counter gear 239, and second speed gear 229.

When the dog clutch 217 meshes with the third speed gear 231, a shift output for the output of the start clutch 203 is performed to the propeller shaft 219 through the fourth speed gear 233, counter gear 243, counter gear 241, and third speed gear 231.

When the dog clutch 217 meshes with the fourth speed gear 231, the output of the start clutch 203 is directly output to the propeller shaft 219.

The clutch actuator 207 performs a fastening adjustment of the start clutch 203 and uses a hydraulic actuator or the like. For example, an electric motor receives a signal from the controller 211 and is operated to drive a push rod of a master cylinder, thereby adjusting a fastening force of the start clutch 203 and controlling a transmission torque.

The shift actuator 209 causes the shift movements of the dog clutches 215 and 217 and is provided with a shift drum 245, shift forks 247 and 249, standby mechanisms 251 and 253, and the like.

The shift drum 245 is provided with grooves 245a and 245b for the shifting, and is configured to be driven and rotated by a shift motor (not illustrated) based on a manual operating signal of a shift lever, or an accelerator position signal, vehicle speed signal, and the like due to an operation of an accelerator pedal. The accelerator position is detected by an accelerator position sensor 258 and is input to the controller 211.

The shift forks 247 and 249 are attached to shift rods 257 and 259 and the shift rods 257 and 259 engage with tire shift drum 245 through the standby mechanism 251 and 253, respectively.

The controller 211 has a function as the torque detector that calculates a generated torque of the engine 213 according to the accelerator position and the number of rotation of the engine 213 to estimate a torque "A" that is transmitting by the start clutch toward, the rear wheels 225a and 225b. The number of rotation of the engine 213 is detected by a revolution sensor 265 and is input to the controller 211.

A shift operation is detected from a shift member, the shift controller 211, and the like, to perform the fastening adjustment so that a transmission capacity of the start clutch is reduced to "A" during an interval just before and after shifting a gear.

The controller 211 is configured to output signals for cutting off combustion, fuel, and the like to the engine 213 when reducing the transmission torque of the start clutch 203. However, it may be configured not to output the signals for cutting off the combustion, fuel, and the like to the engine 213 when reducing the transmission torque of the start clutch 203.

Figure 22A:
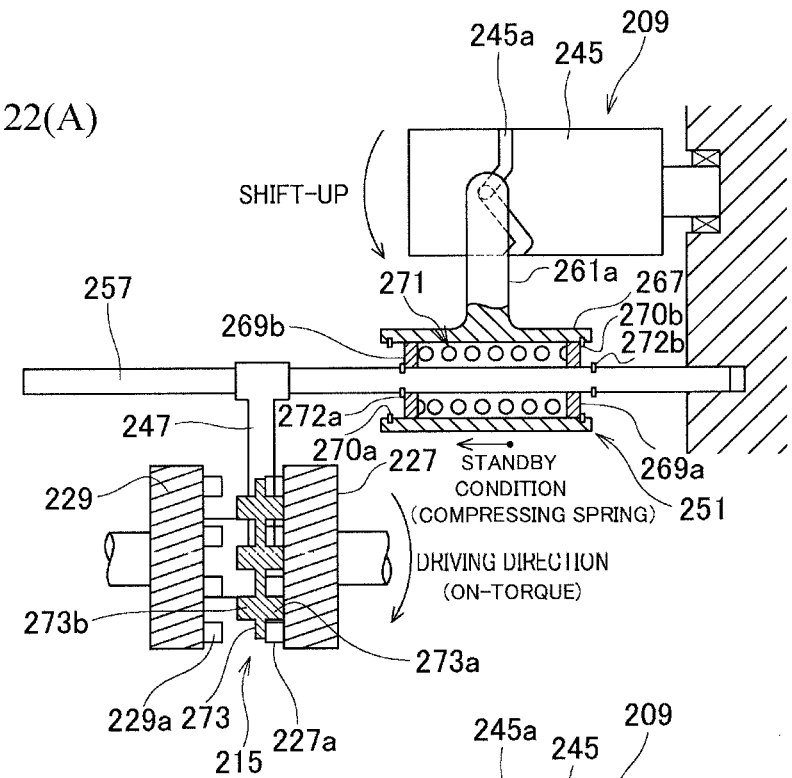
FIG. 22 illustrate a relationship between a standby mechanism and a dog clutch, (a) is a schematic view illustrating a standby state and (b) is a schematic view illustrating an after-operation state.
Figure 22B:
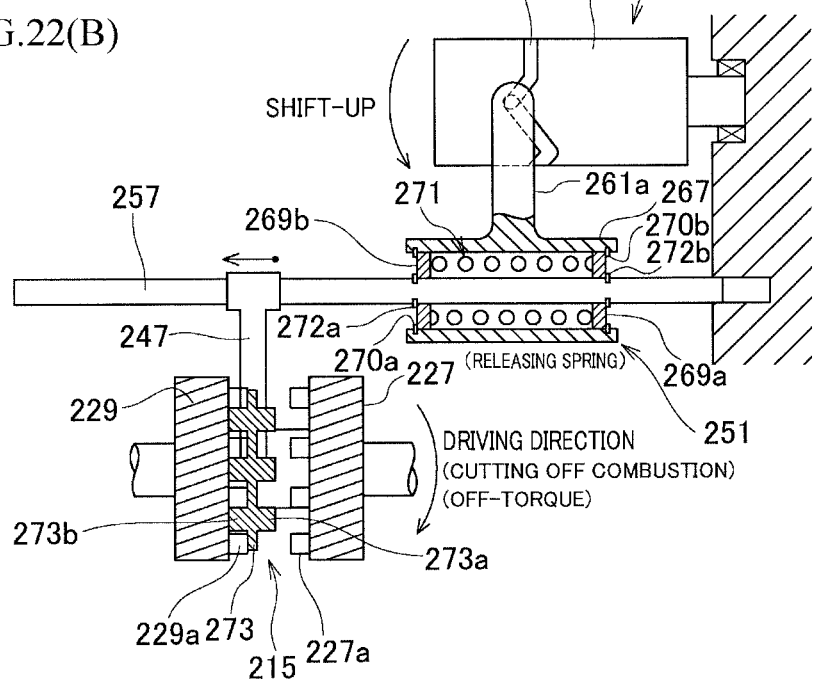

FIG. 22 illustrate a relationship between a standby mechanism and a dog clutch in which (a) is a schematic view illustrating a standby state and (b) is a schematic view illustrating an after-operation state.

In FIG. 22, only the standby mechanism 251 on the dog clutch 215 side will be explained. The standby mechanism on the dog clutch 217 side is the same structure.

As illustrated in FIG. 22, the standby mechanism 251 is provided with a cylinder 267, pistons 269a and 269b, a coil spring 271. The cylinder 267 is integrally provided, with a shift arm 261a and is movable in an axial direction of the shift rod 257. In addition, in the standby mechanism 253, a shift arm 261b is used instead.

The pistons 269a and 269b are restricted in axially outward movements with respect to the cylinder 267 by snap rings 207a and 207b and are restricted in axial movements exceeding a given amount with respect to the shift rod 257.

The coil spring 271 is interposed between the pistons 269a and 269b.

A tip end side of the shift fork 247 engages with a clutch, ring 273 of the dog clutch 215, and meshing teeth 273a, 273b, 227a, and 229a are formed on both faces of the clutch ring 273 and opposing faces of the first speed gear 227 and the second speed gear 229.

Then, the shift arm 261a is operated by a guidance of the groove 245a according to the rotation of the shift drum 245. Due to this, even if the cylinder 267 is axially driven toward the second speed gear 229, a meshing engagement is held by a frictional force between the meshing teeth 273a of the clutch ring 273 and the meshing teeth 227a of the first speed gear 227 as long as the fastening force of the start clutch 203 is sufficient.

Accordingly, the spring 271 is compressed between the piston 269a that moves together with the cylinder 267 through the snap ring 270b and the piston 289b that is positioned by the snap ring 272a, and stores a pressing force. Keeping on storing the pressing force causes the dog clutch 215 to stand by the shifting movement.

When receiving a signal of a completion of the shift operation of the shift actuator, an output torque is cut for an instant in time by cutting off the combustion of the engine, fuel or the like.

As a result, the frictional force between the meshing teeth 273a of the clutch ring 273 and the meshing teeth 227a of the first speed gear 227 is reduced. The pressing force stored in the spring 271 exceeds the reduced frictional force, whereby the shift fork 247 instantly operates through the shift rod 257.

Through this operation, the clutch ring 273 moves toward the second speed gear 229, the meshing teeth 273b mesh with the meshing teeth 229a of the second speed gear 229, and the second speed gear 229 performs the shift output.

At this time, the transmission torque of the start clutch 203 is reduced to at least "A" for maintaining a transmitting torque between the rear wheels 225a and 225b as drive wheels to shift the gear, thereby reducing a shock at the time of shifting the gear.

Figure 23:
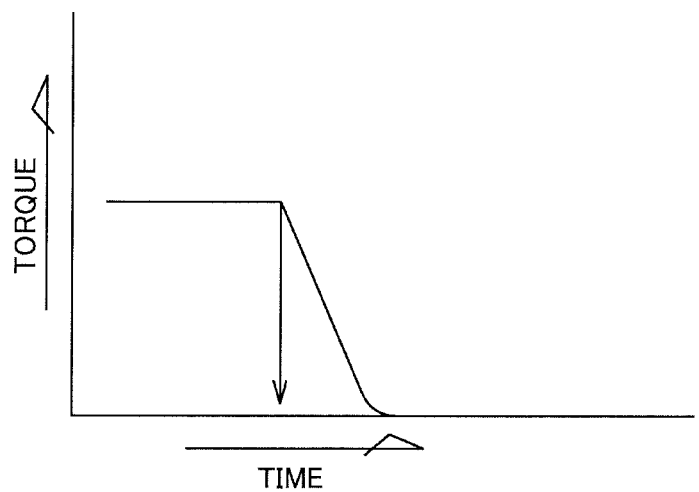
FIG. 23 is a graph illustrating a reduction in torque due to a disengagement of a start clutch.

FIG. 23 is a graph illustrating a change in a driving torque applied to the rear wheels 225a and 225b when a driving input torque is steeply interrupted, e.g., a meshing engagement of a shifting clutch transitions to neutral.

As illustrated, in FIG. 23, the driving torque on the rear wheels 225a and 225b does not instantly become zero as illustrated with, an arrow even if the meshing engagement of the meshing clutch is shifted into neutral so that the driving torque is interrupted, and it reduces with a temporal declination due to natural frequency. Generally, time until the torque becomes zero is about 0.1 to 0.2 second. The declination is determined according to an inertia mass of an upstream of the drive shafts 223a and 223b, the propeller shaft 219, and the like and a rigidity of the drive shafts 223a and 223b, the propeller shaft 219, and the like.

If the shift is instantly performed and time to stay into neutral is a very short time of about 0.02 second, the shift can be completed while the reduction of the driving torque on the rear wheels is small. The shift in a short time is easily realized by a combination of the meshing clutches with no synchronizing mechanism and the standby mechanisms.

Figure 24:
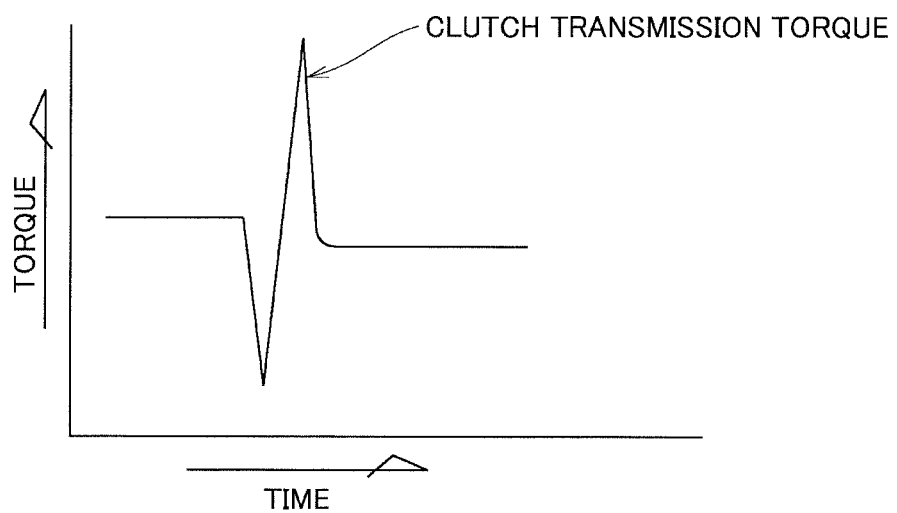

FIG. 24 is a graph illustrating a gear shift shock when forcibly shifting up into an upper stage gear without a disengagement of the star clutch. Once a driving force is interrupted and then a large shock torque is generated due to energy of motion according to a difference with respect to a rotation speed of the engine. FIG. 25 is a graph illustrating a change in torque when shifting up into an upper stage gear with a standard shift operation. It shows an interruption of the driving force for a long time.

From the above, the large shock is generated if the shift operation is performed while keeping the engagement of the start clutch as illustrated in FIG. 24, the interruption of the driving force occurs for a long time if the standard shift operation is performed, with the disengagement of the clutch, and a driver feels strange particularly in an automated manual transmission that shifts gears regardless of a driver's intention.

FIG. 26 is a graph illustrating a change in clutch transmission torque capacity and a torque transmission characteristics according to the shift control system of the present embodiment. The rapidly instantly shift operation hardly involves a reduction in torque and an appropriate control of the start clutch has a less interruption of the driving torque and a less gear shift shock. A hatched portion in FIG. 26 is a shock torque absorbed by a sliding in the clutch.

As illustrated in FIG. 26, the present embodiment does not cut off the start clutch 203 at the time of shifting a gear, but reduces the transmission torque of the start clutch 203 to "A" during an interval just before and after shifting a gear according to the generated torque of the engine just before the shifting.

Through such a control of the transmission torque of the start clutch 203, the transmission torque in the start clutch, 203 is reduced while maintaining the transmitting torque between the start clutch 203 and the rear wheels 225a and 225b, thereby realising the shift operation with the reduction of the gear shift shock and no interruption of acceleration.

If it reduces the transmission torque of the start clutch 203 and outputs signals for cutting off combustion, fuel, and the like to the engine 213, the instant shift operation is further secured according to the reduction of the output torque of the engine 213 by the standby mechanisms that are pre-shifted.

As a dotted line in FIG. 21, between the start clutch 203 and the rear wheels 225a and 225b, on a downstream side of the transmission 205 in the present embodiment, a fly wheel 275 is attached as an inertial mass that urges an inertial rotation. Due to this, natural frequency of a driving force transmission system on the rear wheels 225a and 225b side is lowered, the declination in torque reduction illustrated in FIG. 23 becomes smaller, and the transmission torque between the rear wheels 225a and 225b is surely maintained.

FIG. 27 is a control flowchart according to the present embodiment.

The flowchart of FIG. 27 is carried out according to the engine start-up.

In Step S201, a process of "a manually or automatically shifting instruction" is carried out.

The manually shifting instruction causes the controller 211 to output a signal to the shift actuator 209 according to the instruction when, for example, shifting up or down a gear by operating a shift lever in a manual mode.

The shift actuator 209 rotates the shift drum 245 through the rotation of the electric motor, to arbitrarily operate the dog clutches 215 and 217 through the shift arms 261 and 263, shift rods 257 and 259, standby mechanisms 251 and 253, and shift forks 247 and 249 so that the transmission 205 shifts a gear.

The automatically shifting instruction causes the controller 211 to calculate an appropriate shift stage based on the number of rotation of the engine, accelerator position, and vehicle speed and output a signal to the shift actuator 209 according to the calculation. With the output signal, the shift operation is performed in the same way as the above.

In this shift operation, when of, for example, shifting from the first speed gear 227 into the second speed gear 229 as mentioned above, the standby mechanism 251 stores and keeps the pressing force to cause the dog clutch 215 to stand by the shifting movement.

In Step S202, a process of "detecting a transmitting torque 1 toward the rear wheels" is carried out.

In Step S203, the clutch actuator reduces the fastening force of the start clutch according to the result in Step S202.

In Step S204, the torque of the meshing clutch is interrupted in an instant of time. Due to this, the frictional force of the meshing clutch is reduced, the clutch ring 273 is instantly moved toward the second speed gear 229 by the energy of the standby mechanism, and the meshing teeth 273b engage with the meshing teeth 229a of the second speed gear 229 to perform the shift operation by the second speed gear 229.

In Step S205, a process of "fastening the clutch 100 percent again" is carried out to complete the shift operation.

Embodiment 2 of the present invention is provided with the start clutch 203 that transmits and outputs the torque from the engine 213 according to the fastening adjustment, the transmission 5 that shifts gears through the shifting movements of the dog clutches 215 and 217 according to the vehicle speed to output the torque transmitted and output from the start clutch 203 to the rear wheels 225a and 225b, the clutch actuator 207 that performs the fastening adjustment of the start clutch 203, the shift actuator 209 that causes the shifting movement of the dog clutches 215 and 217, the torque detector 211 that detects the transmitting torque toward the rear wheels 225a and 225b, the controller (clutch controller) 211 that controls the clutch actuator 209 to perform the fastening adjustment so that a transmission torque 2 of the start clutch 203 is reduced while maintaining the transmitting torque 1 detected by the controller (torque detector) 211 at the time of shifting the gear.

Accordingly, it can shift a gear while maintaining a torsional torque just before shifting the gear between shift driven gears and the rear wheels 225a and 225b, thereby involving no interruption of the driving force and preventing gear shift shocks and delays in acceleration.

Additionally, it can largely reduce the weight with respect to a twin-clutch transmission and simplify the structure with use of the dog clutches 215 and 217.

The controller 211 calculates the transmitting torque 1 at the time of shifting the gear according to the accelerator position and the number of rotation of the engine 213.

Accordingly, the transmission torque 2 of the start clutch 203 can be reduced while accurately maintaining the transmitting torque 1 at the time of shifting the gear.

The standby mechanisms 251 and 253 are interposed so as to maintain the pressing force due to the coil spring 271 till the transmission torque of the meshing clutch is reduced by cutting off the combustion or the like through the controller 211, thereby causing the dog clutches 215 and 217 to stand by the shifting movement.

Accordingly, although it has the simple structure with the use of the dog clutches 215 and 217, the shift operation is instantly performed while maintaining the transmitting torque "A" at the time of shifting the gear.

The fly wheel 275 is provided between the start clutch 203 and the rear wheels 225a and 225b to urge the inertial rotation.

Accordingly, the natural frequency of the driving force transmission system on the rear wheels 225a and 225b side is lowered, the declination in torque reduction illustrated in FIG. 23 becomes smaller, and the reduction in torque of the drive wheels can be minimized.

FIG. 28 is a graph, illustrating a change in number of rotation of the engine. As explained with reference to FIGS. 21-27, it causes a clutch control to stand by in a given engagement condition before shifting a gear according to the accelerator position and the number of rotation of the engine 213, and it measures a differentiated value of the number of rotation, of the engine at the time of shifting the gear. It controls so that the clutch engagement is weakened if the differentiated value is smaller than a target value and the clutch engagement is strengthened if the differentiated value is larger than the target value. The target value is a proper negative amount as illustrated in the drawing.

Therefore, it generates a most appropriate transmission torque to be able to smoothly shift gears.

In the shift control system according to Embodiment 2 of the present invention, the standby mechanisms 251 and 253 may be omitted. In this case, the shift rods 257 and 259 are directly attached to the shift forks 247 and 249 so that the shift arms 261 and 263 directly operate the shift rods 257 and 259.

Even in this case, the instant shift can be performed by a solenoid or the like when the transmission torque 2 of the start clutch 203 is reduced.

The shift control system according to Embodiment 2 of the present invention can be realised by the transmission 1 of Embodiment 1 instead of the transmission 205.

The invention claimed is:

1. A transmission comprising:
    multiple stage shift gears fixed to or relatively rotatably supported with driving force transmission shafts;
    a plurality of clutch rings each having meshing parts on both sides for meshing with the respective shift gears that take two speeds or more away from each other, so as to connect the respective shift gears to the driving force transmission shafts and perform a shifted output;
    a shift operation part that selectively operates the clutch rings;
    guide parts that are provided for respective stages of the shift gears between the clutch rings and the driving force transmission shafts so that, when meshing engagements of the clutch rings of an upper stage and a lower stage are simultaneously performed through the operation of the shift operation part in which the operation of the shift operation part is selected from the group consisting of a shift-up operation of the operation part and a shift-down operation of the operation part, axial forces oriented in opposite directions that are a meshing-engagement direction and a meshing-release direction are generated on the clutch rings of the upper stage and the lower stage.

2. The transmission according to claim 1, wherein:
    when meshing engagements of the clutch rings of the upper stage and the lower stage are simultaneously performed through the shift-up operation of the shift operation part, an axial force oriented in the meshing-engagement direction is generated on the clutch ring of the upper stage and an axial force oriented in the meshing-release direction is generated on the clutch ring of the lower stage.

3. The transmission according to claim 1, wherein:
    when meshing engagements of the clutch rings of the upper stage and the lower stage are simultaneously performed through the shift-down operation of the shift operation part, an axial force oriented in the meshing-engagement direction is generated on the clutch ring of the lower stage and an axial force oriented in the meshing-release direction is generated on the clutch ring of the upper stage.

4. The transmission according to claim 1, wherein:
    each guide part has a projection, a groove including flat ends and a v-shaped central part, and an axially-slidable member that transmits a torque to the projection or the groove engaging with the projection so that an axial thrust is not generated when a corresponding clutch ring among said plurality of clutch rings performs a torque transmission through the ends of the groove, and an axial thrust oriented in the meshing-engagement direction is generated by a drive torque and an axial thrust oriented in the meshing-release direction is generated by a coasting torque when the corresponding clutch ring performs the torque transmission through a portion positioned away from the ends of the groove at a given distance.

5. The transmission according to claim 1, further comprising:
    a mechanism that transmits a thrust acting on one of the clutch rings through the shift operation part to another one of the clutch rings when needed.

6. The transmission according to claim 1, wherein:
    each guide part has a mechanism through which a depth of the meshing engagement of a corresponding clutch ring among said plurality of clutch rings becomes shallower at a time of a drive torque transmission and becomes deeper at a time of a coasting torque transmission.

7. The transmission according to claim 1, wherein:
    the clutch rings of the upper stage and lower stage have a double engagement state at a time of the shift-up operation and has no double engagement state at a time of the shift-down operation.

8. The transmission according to claim 1, wherein:
    the clutch rings of the upper stage and lower stage have a double engagement state at a time of the shift-down operation and has no double engagement state at a time of the shift-up operation.

9. The transmission according to claim 1, further comprising:
    a torsion bar incorporated in the driving force transmission shaft that receives an input driving force through the torsion bar.

10. The transmission according to claim 1, wherein:
    the driving force transmission shaft receives a driving input through a torque converter.

* * * * *